United States Patent
Mo et al.

(10) Patent No.: US 10,754,706 B1
(45) Date of Patent: Aug. 25, 2020

(54) TASK SCHEDULING FOR MULTIPROCESSOR SYSTEMS

(71) Applicant: MicroStrategy Incorporated, Vienna, VA (US)

(72) Inventors: Jinghui Mo, Annandale, VA (US); Ananya Ojha, Dunn Loring, VA (US); Will Hurwood, Washington, DC (US); Huadong Xia, McLean, VA (US)

(73) Assignee: MicroStrategy Incorporated, Vienna, VA (US)

( * ) Notice: Subject to any disclaimer, the term of this patent is extended or adjusted under 35 U.S.C. 154(b) by 0 days.

(21) Appl. No.: 15/954,032

(22) Filed: Apr. 16, 2018

(51) Int. Cl.
G06F 9/50 (2006.01)
G06F 9/48 (2006.01)

(52) U.S. Cl.
CPC .......... *G06F 9/5088* (2013.01); *G06F 9/48* (2013.01); *G06F 9/485* (2013.01); *G06F 9/4843* (2013.01); *G06F 9/4856* (2013.01); *G06F 9/4881* (2013.01); *G06F 9/4887* (2013.01); *G06F 9/50* (2013.01); *G06F 9/5005* (2013.01); *G06F 9/5061* (2013.01); *G06F 9/5083* (2013.01)

(58) Field of Classification Search
CPC .......... G06F 9/48; G06F 9/4843; G06F 9/485; G06F 9/4856; G06F 9/4881; G06F 9/50; G06F 9/5005; G06F 9/5061; G06F 9/5083; G06F 9/5088
See application file for complete search history.

(56) References Cited

U.S. PATENT DOCUMENTS

| | | |
|---|---|---|
| 5,428,789 A | 6/1995 | Waldron |
| 5,872,963 A | 2/1999 | Bitar et al. |
| 6,195,676 B1 | 2/2001 | Spix et al. |
| 6,434,590 B1 | 8/2002 | Blelloch et al. |
| 6,766,515 B1 | 7/2004 | Bitar et al. |
| 6,993,762 B1 | 1/2006 | Pierre |
| 8,578,386 B1 | 11/2013 | Bali et al. |
| 8,621,480 B2 * | 12/2013 | Gootherts ............. G06F 9/5088 709/224 |
| 8,695,009 B2 | 4/2014 | Vojnovic et al. |

(Continued)

OTHER PUBLICATIONS

Blumofe, R. "The Cilk Language and Work-Stealing Scheduler," Retrieved from the Internet: https://www.usenix.org/legacy/publications/library/proceedings/ana97/full_papers/blumofe/blumofe_html/node2.html, dated Nov. 13, 1996, 4 pages.

(Continued)

*Primary Examiner* — Charles M Swift
(74) *Attorney, Agent, or Firm* — Fish & Richardson P.C.

(57) ABSTRACT

Methods, systems, and apparatus, including computer-readable storage devices, for task scheduling in a multiprocessor system. The processors of a multiprocessor system are partitioned into two groups, a first group of processors that preferentially execute new, short-running tasks and a second group of processors that preferentially execute suspended, long-running tasks. A scheduler of the multiprocessor system maintains queues of new and suspended tasks, suspends tasks, and assigns tasks to the processors according to their group preference. By designating different processors to preferentially execute new, short-running tasks or suspended, long-running tasks, the multiprocessor system may more efficiently manage workloads that contain a mixture of task types.

20 Claims, 14 Drawing Sheets

(56) References Cited

U.S. PATENT DOCUMENTS

| | | | |
|---|---|---|---|
| 8,924,978 B2 | 12/2014 | Meng et al. | |
| 8,943,252 B2 | 1/2015 | Waters et al. | |
| 9,092,266 B2 | 7/2015 | Boutin et al. | |
| 9,128,763 B2 | 9/2015 | Sarkar et al. | |
| 10,185,566 B2* | 1/2019 | Naveh | G06F 9/4856 |
| 2002/0194251 A1* | 12/2002 | Richter | G06F 9/5011 718/105 |
| 2005/0039159 A1* | 2/2005 | Pan | G06F 8/314 717/100 |
| 2005/0071843 A1 | 3/2005 | Guo et al. | |
| 2005/0081207 A1* | 4/2005 | Hoflehner | G06F 8/441 718/100 |
| 2005/0188373 A1 | 8/2005 | Inoue et al. | |
| 2006/0123420 A1 | 6/2006 | Nishikawa | |
| 2006/0190942 A1 | 8/2006 | Inoue et al. | |
| 2008/0155197 A1 | 6/2008 | Li et al. | |
| 2009/0037926 A1 | 2/2009 | Dinda et al. | |
| 2010/0274879 A1 | 10/2010 | Wolfe | |
| 2011/0302587 A1 | 12/2011 | Nishikawa et al. | |
| 2013/0061220 A1* | 3/2013 | Gnanasambandam | G06F 9/45558 718/1 |
| 2014/0109102 A1 | 4/2014 | Duncan et al. | |
| 2014/0157038 A1* | 6/2014 | Ashok | G06F 9/44 714/2 |
| 2014/0310712 A1 | 10/2014 | Meng et al. | |
| 2015/0040131 A1* | 2/2015 | Shan | G06F 9/5027 718/1 |
| 2015/0135183 A1* | 5/2015 | Kipp | G06F 9/46 718/103 |
| 2015/0200854 A1* | 7/2015 | Buchnik | H04L 47/10 709/235 |
| 2015/0339158 A1 | 11/2015 | Harris et al. | |
| 2017/0357530 A1* | 12/2017 | Shih | G06F 9/5038 |
| 2018/0276040 A1* | 9/2018 | Hosmani | G06F 9/4881 |

OTHER PUBLICATIONS

Carpenter et al., "A Categorization of Real-Time Multiprocessor Scheduling Problems and Algorithms," University of North Carolina, year 2004, 30 pages.

Cilk, From Wikipedia, the free encyclopedia, available on Sep. 9, 2013, Retrieved from the Internet: https://en.wikipedia.org/wiki/Cilk.

Davis et al., "A Survey of Hard Real-Time Scheduling for Multiprocessor Systems," University of New York, dated Oct. 2011, 44 pages.

Feinbube et al., "Evolving Scheduling Strategies for Multi-Processor Real-Time Systems," University of Potsdam, Germany, year 2015, 6 pages.

Guo et al., "Work-First and Help-First Scheduling Policies for Async-Finish Task Parallelism," Department of Computer Science, dated May 2009, 2 pages.

Intel Threading Building Blocks: Tutorial, retrieved from the Internet: https://www.inf.ed.ac.uk/teaching/courses/ppls/TBBtutorial.pdf, year 2011, 90 pages.

Job Shop Scheduling, From Wikipedia, the free encyclopedia, available on Jul. 2, 2018, Retrieved from the Internet https://en.wikipedia.org/wiki/Job_shop_scheduling, 8 pages.

Kale, V. "Looping Scheduling in OpenMp," University of Southern California/Information Sciences Institute, dated Nov. 2017, 16 pages.

[No Author Listed] "Load Balancing and Scheduling for Multiprocessor Systems," University of Cyprus, year 2007, 80 pages.

Maclaren, N. "Introduction to OpenMp," Simple SPMD etc. dated Sep. 2017, 33 pages.

Multiprocessor Scheduling, From Wikipedia, the free encyclopedia, available on Jun. 22, 2018, Retrieved from the Internet: https://en.wikipedia.org/wiki/Multiprocessor_scheduling, 3 pages.

[No Author Listed] "OpenMP* Loop Scheduling," Compiler Methodology for Intel, dated Sep. 4, 2012, 3 pages.

Peloquin et al., A Comparison of Scheduling Algorithms for Multiprocessors, dated Dec. 13, 2010, 17 pages.

[No Author Listed] "Scheduling of Parallel Loops," Dartmouth College, dated Mar. 23, 2009, 1 page.

Simplified Design Flow, Retrieved from the Internet: https://www.it.uu.se/edu/course/homepage/realtid/ht10/schedule/multiprocessor-1.pdf, Retrieved on Aug. 9, 2018, 37 pages.

Threading Building Blocks, From Wikipedia, the free encyclopedia, available on Sep. 12, 2017, Retrieved from Internet: https://en.wikpedia.org/wiki/Threading_Building_Blocks, 4 pages.

Venkataraman et al., "Task Scheduling for Runtime-Assisted Parallelism," University of Wisconsin, Madison, year 2005, 11 pages.

* cited by examiner

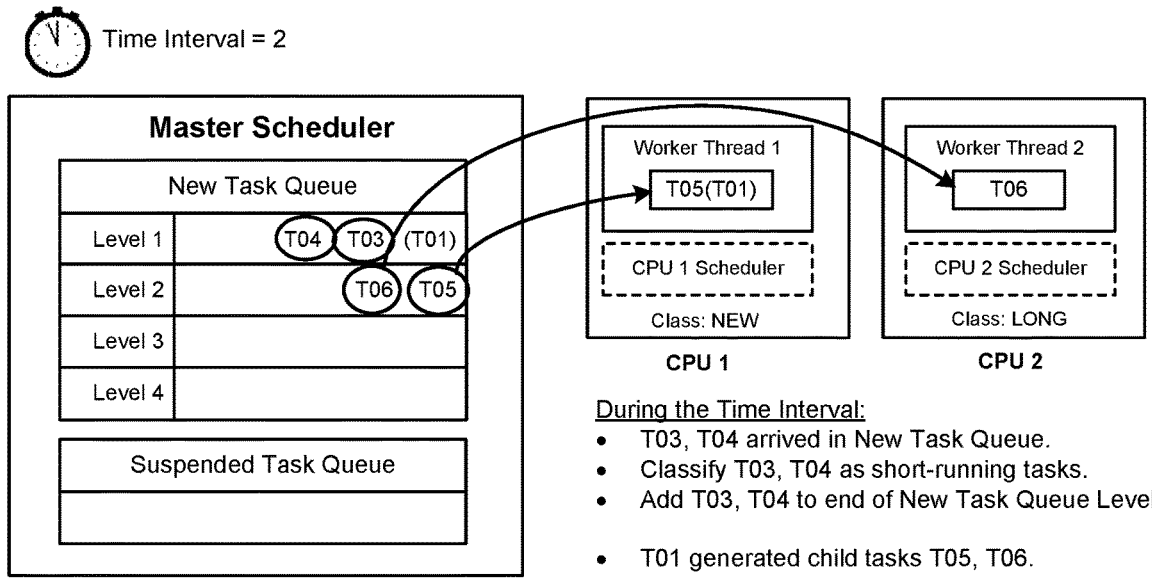

⏱ Time Interval = 2

Master Scheduler

New Task Queue

| Level 1 | T04 T03 (T01) |
| Level 2 | T06 T05 |
| Level 3 | |
| Level 4 | |

Suspended Task Queue

TX(TY) = Parent Task TY on the stack of child task TX

Worker Thread 1: T05(T01)
CPU 1 Scheduler
Class: NEW
CPU 1

Worker Thread 2: T06
CPU 2 Scheduler
Class: LONG
CPU 2

During the Time Interval:
- T03, T04 arrived in New Task Queue.
- Classify T03, T04 as short-running tasks.
- Add T03, T04 to end of New Task Queue Level 1.

- T01 generated child tasks T05, T06.
- Classify T05, T06 as short-running tasks
- Add T05, T06 to end of New Task Queue Level 2
- Assign New Task CPU 1 to run T05 with T01 kept on stack, from front of New Task Queue.

- T02 completed.
- Assign Long Task CPU 2 to run T06, from front of New Task Queue

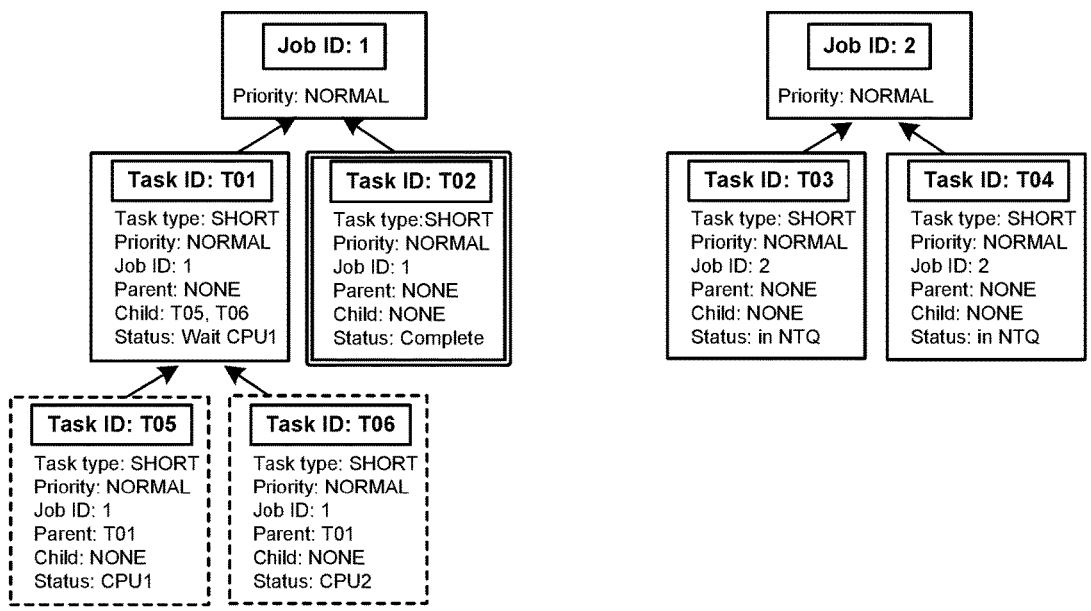

Job ID: 1
Priority: NORMAL

Task ID: T01
Task type: SHORT
Priority: NORMAL
Job ID: 1
Parent: NONE
Child: T05, T06
Status: Wait CPU1

Task ID: T02
Task type: SHORT
Priority: NORMAL
Job ID: 1
Parent: NONE
Child: NONE
Status: Complete Task ID: T05
Task type: SHORT
Priority: NORMAL
Job ID: 1
Parent: T01
Child: NONE
Status: CPU1

Task ID: T06
Task type: SHORT
Priority: NORMAL
Job ID: 1
Parent: T01
Child: NONE
Status: CPU2

Job ID: 2
Priority: NORMAL

Task ID: T03
Task type: SHORT
Priority: NORMAL
Job ID: 2
Parent: NONE
Child: NONE
Status: in NTQ Task ID: T04
Task type: SHORT
Priority: NORMAL
Job ID: 2
Parent: NONE
Child: NONE
Status: in NTQ

FIG. 6B

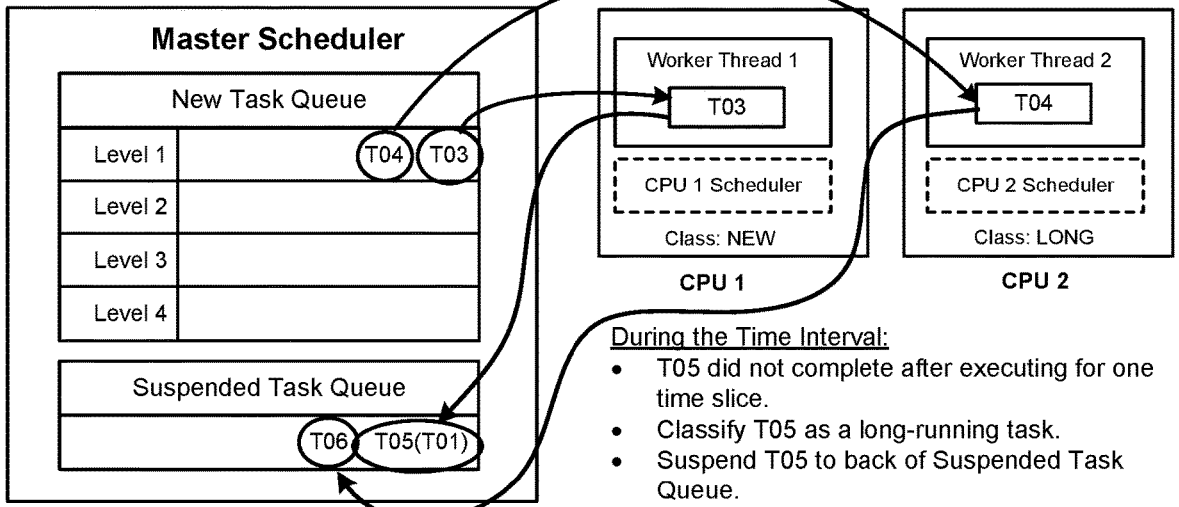

TX(TY) = Parent Task TY on the stack of child task TX

During the Time Interval:
- T05 did not complete after executing for one time slice.
- Classify T05 as a long-running task.
- Suspend T05 to back of Suspended Task Queue.
- Assign New Task CPU 1 to run T03, from front of New Task Queue.

- T06 did not complete after executing for one time slice.
- Classify T06 as a long-running task.
- Suspend T06 to back of Suspended Task Queue.
- Assign CPU 2 to run T04, from front of New Task Queue.

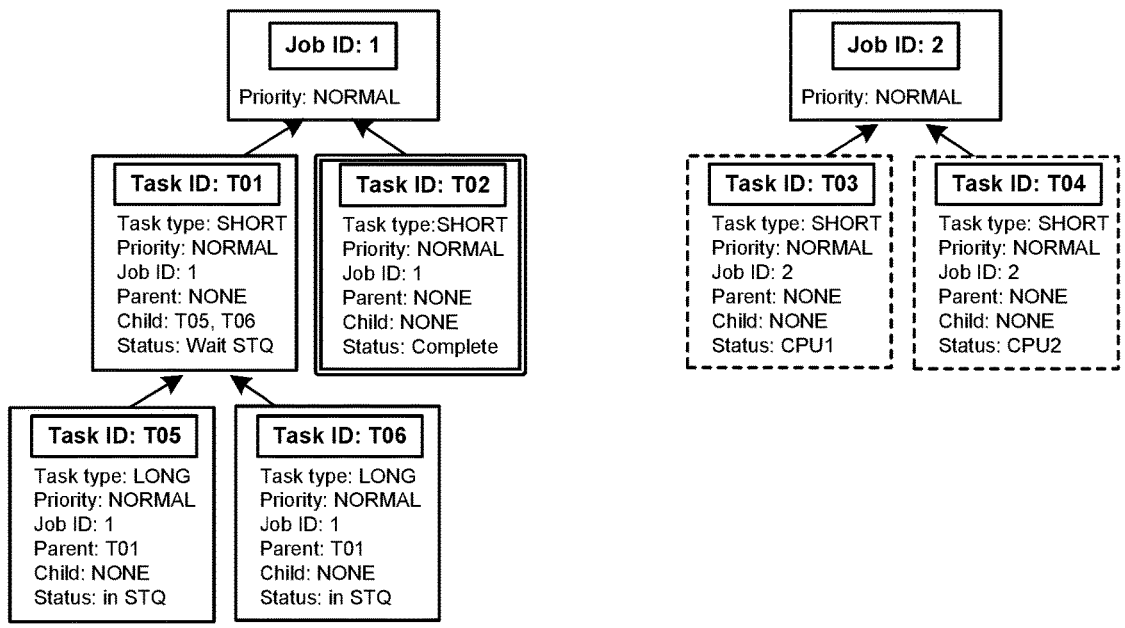

FIG. 6C

 Time Interval = 5

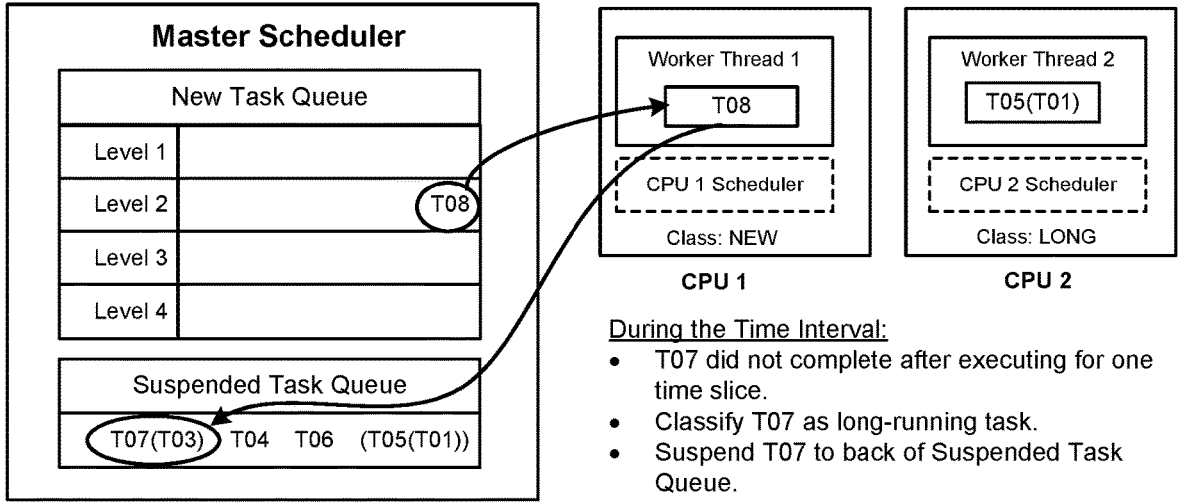

TX(TY) = Parent Task TY on the stack of child task TX

During the Time Interval:
- T07 did not complete after executing for one time slice.
- Classify T07 as long-running task.
- Suspend T07 to back of Suspended Task Queue.
- Assign New Task CPU 1 to run T08, from front of New Task Queue.

- T05 did not complete after executing for one time slice.
- Because there is no higher priority task in Suspended Task Queue, Long Task CPU 2 continues to run T05.

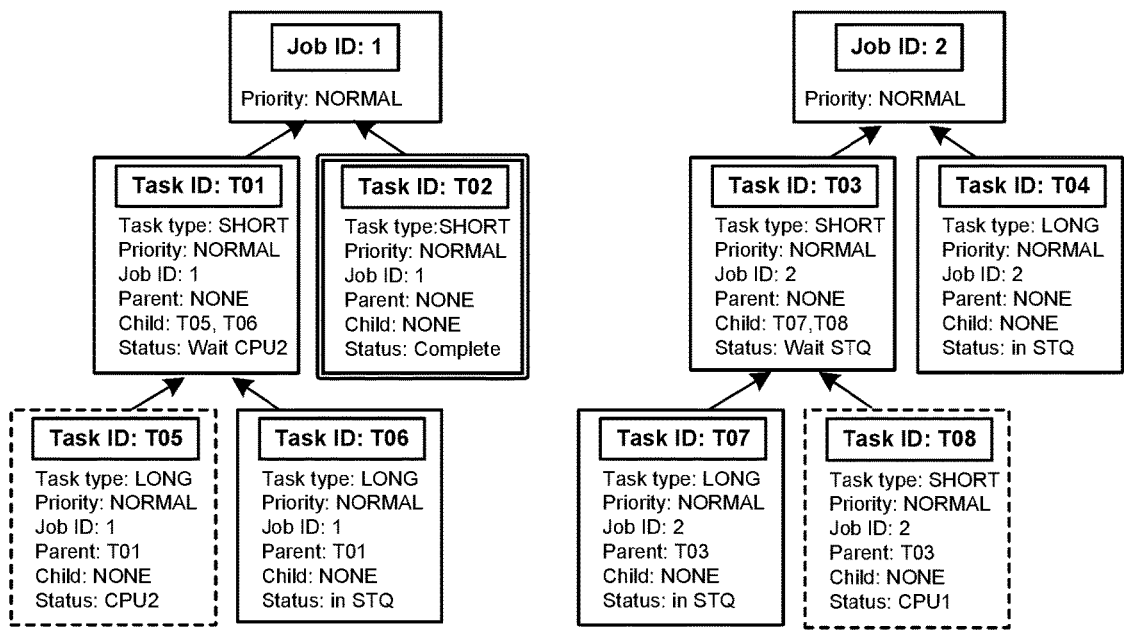

FIG. 6E

Time Interval = 8

During the Time Interval:
- T07 completed, which completes T03 → Job 2 completed.
- Assign no task to New Task CPU 1.
- Assign no task to Long Task CPU 2.

TX(TY) = Parent Task TY on the stack of child task TX

700

```
┌─────────────────────────────────────────────────────┐
│ ASSIGN PROCESSORS TO FORM A FIRST GROUP OF PROCESSORS│
│        AND A SECOND GROUP OF PROCESSORS          702 │
└─────────────────────────────────────────────────────┘
                          │
                          ▼
┌─────────────────────────────────────────────────────┐
│ ASSIGN THE PROCESSORS IN THE FIRST GROUP OF PROCESSORS│
│ TO EXECUTE TASKS GIVING PRIORITY TO TASKS IN A FIRST │
│ TASK QUEUE INCLUDING TASKS THAT HAVE EXECUTED FOR    │
│ LESS THAN A PREDETERMINED AMOUNT OF TIME         704 │
└─────────────────────────────────────────────────────┘
                          │
                          ▼
┌─────────────────────────────────────────────────────┐
│    ASSIGN THE PROCESSORS IN THE SECOND GROUP OF      │
│ PROCESSORS TO EXECUTE TASKS GIVING PRIORITY TO TASKS │
│ IN A SECOND TASK QUEUE INCLUDING TASKS THAT HAVE     │
│ EXECUTED FOR AT LEAST THE PREDETERMINED AMOUNT OF    │
│                       TIME                       706 │
└─────────────────────────────────────────────────────┘
                          │
                          ▼
┌─────────────────────────────────────────────────────┐
│ DETERMINE THAT A PARTICULAR TASK IN THE FIRST TASK   │
│ QUEUE HAS EXECUTED FOR AT LEAST THE PREDETERMINED    │
│                  AMOUNT OF TIME                  708 │
└─────────────────────────────────────────────────────┘
                          │
                          ▼
┌─────────────────────────────────────────────────────┐
│ SUSPEND EXECUTION OF THE PARTICULAR TASK BY THE      │
│ PROCESSORS IN THE FIRST GROUP, REMOVE THE PARTICULAR │
│ TASK FROM THE FIRST TASK QUEUE, AND ADD THE PARTICULAR│
│ TASK TO THE SECOND TASK QUEUE FOR EXECUTION BY THE   │
│         PROCESSORS IN THE SECOND GROUP           710 │
└─────────────────────────────────────────────────────┘
```

FIG. 7

TASK SCHEDULING FOR MULTIPROCESSOR SYSTEMS

BACKGROUND

This specification relates generally to task scheduling for multi-processor systems.

SUMMARY

Many modern computing systems include multiple central processing units (CPUs or cores) that execute tasks concurrently, i.e., in parallel. Multiprocessor systems often have resource schedulers that are intended to maximize utilization of computing resources, e.g., CPU processing cycles. In some situations, complex, long-running jobs may consume resources while many simpler, short-running jobs are waiting. As a result, while utilization is high, response times and completion times for simple jobs may be unnecessarily long as the long-running jobs block others from executing. On the other hand, if a scheduler simply prioritizes simple jobs, a high volume of simple jobs may keep long-running jobs from being allocated sufficient resources to finish efficiently.

In some implementations, the CPUs in multiprocessor systems may be partitioned into two subsets: one set that preferentially runs new or short-running tasks, and one set that preferentially runs previously suspended or long-running tasks. By designating CPUs to preferentially run different types of tasks, a multiprocessor system may more efficiently manage workloads that contain a mixture of task types, reducing the average response time for short jobs and ensuring timely completion of long jobs, while maintaining high resource utilization. In some implementations, the number of CPUs allocated to execute different task types may be changed dynamically, e.g., in response to varying workloads or users, to improve overall system performance and reduce task completion times.

The multiprocessor system also includes one or more resource schedulers that perform a variety of operations related to task management, including maintaining task queues and assigning tasks for execution on individual CPUs. The resource schedulers can use task queues track and order execution for pending and incomplete tasks. In some implementations, a scheduler may maintain two task queues, (1) a new task queue for previously unexecuted (e.g., new or short-running) tasks and (2) a suspended task queue for tasks that began execution, but were suspended before completing (e.g., long-running tasks). In some implementations, the resource schedulers may preferentially assign a subset of CPUs to run tasks from the new task queue while preferentially assigning a second subset of CPUs to resume running suspended tasks from the suspended task queue.

In some implementations, the resource scheduler may track execution of tasks with respect to a predetermined duration or time threshold. For example, the resource scheduler can set a predetermined maximum execution time, e.g., a time unit duration or timeout period, and monitor when execution of a task has reached this maximum time. The time threshold measurement can be done separately for each task, measured from the beginning of execution for each task, so that the time periods allocated for the initial execution of different tasks are staggered in time (e.g., beginning and ending at different times). If the resource scheduler detects that a task has not completed after running on a CPU for at least one time unit, the scheduler may suspend the task from running on the CPU. After suspending the task, the schedulers may assign the CPU to run another task from one of the task queues. The suspended task may then be executed later, likely by a CPU from the group of CPUs assigned to execute suspended or long-running tasks.

In some implementations, a method for task scheduling for multiprocessor systems includes (i) assigning, by a multiprocessor system, processors of the multiprocessor system to form a first group of processors and a second group of processors, (ii) assigning the processors in the first group to execute tasks giving priority to tasks in a first task queue including tasks that have executed for less than a predetermined amount of time, (iii) assigning the processors in the second group to execute tasks giving priority to tasks in a second task queue including tasks that have executed for at least the predetermined amount of time, (iv) determining that a particular task in the first task queue has executed for at least the predetermined amount of time; and (v) in response to determining that the particular task in the first task queue has executed for at least the predetermined amount of time, suspending execution of the particular task by the processors in the first group, removing the particular task from the first task queue, and adding the particular task to the second task queue for execution by the processors in the second group.

In some implementations, assigning the processors by the multiprocessor system includes assigning different amounts of processors to the first group and the second group. In some cases, the method further includes determining that the amounts of processors in the first group and the second group should be changed and changing the assignments of processors in the multiprocessor system among the first group and the second group to satisfy a predetermined relationship.

In some implementations, assigning the processors in the first group to execute tasks giving priority to tasks in the first task queue includes assigning the processors in the first group to execute tasks in the first task queue until no more tasks are available in the first task queue, then executing tasks in the second task queue. Similarly, assigning the processors in the second group to execute tasks giving priority to tasks in the second task queue can include assigning the processors in the second group to execute tasks in the second task queue until no more tasks are available in the second task queue, then executing tasks in the first task queue.

In some implementations, the method further includes prioritizing the tasks in the first task queue based on (i) an order of submission of jobs corresponding to the tasks, and (ii) relationships among the tasks.

In some implementations, the first task queue has multiple levels and tasks are prioritized according to the levels and the method includes (i) determining that execution of a first task in the first task queue generates a new second task, the first task being located in a first level of the multiple levels, (ii) adding the second task to the first task queue in a second level of the multiple levels, and (iii) stopping execution of the first task and executing the second task using a processor in the first group of processors. The method can also include updating the first task queue to indicate the relationship between the second task and the first task, retaining working data of the first task on a processing stack accessible to the processor executing the second task, after completing the second task, resuming execution of the first task.

In some implementations, the method also includes prioritizing the tasks in the second task queue based on an order in which tasks are added to the second task queue. The tasks in the second task queue can be prioritized based on an identity, role, or credential of a user associated with a task in the second task queue.

Implementations of the disclosed task scheduling techniques for multiprocessor systems provide one or more of the following advantages. Tasks that take more than a predetermined maximum execution time to complete can be suspended and later resumed, preventing long-running tasks from monopolizing CPU resources and blocking execution of new or short-running tasks. Dedicating a subset of CPUs to preferentially run new or short-running tasks provides a means for completing simple, short-running jobs, even when complex, long-running jobs have begun execution. As a result, complex, long-running jobs will not block completion of simple, short-running jobs, and the average response time for short-running jobs may be reduced. Dedicating a subset of CPUs to preferentially run previously-suspended, long-running tasks provides a means for completing complex, long-running jobs, even when many simple, short-running tasks are in the queue. As a result, a high volume of simple, short-running tasks will not unnecessarily delay completion of complex, long-running tasks, ensuring that long-running jobs complete execution in a timely manner.

In some implementations, the number of CPUs designated to preferentially run new or suspended tasks may be set by an administrator and may be changed over time, allowing resource allocation to vary based on workload, job prioritization, or other factors. For example, a system administrator may designate more CPUs to preferentially execute new, short-running tasks when the majority of pending jobs are simple jobs, but designate more CPUs to preferentially execute suspended, long-running tasks when the majority of pending jobs are complex jobs. By tailoring resource allocation according to the current or expected workload, job prioritization, or other factors, job response time and system performance in a particular situation may be improved.

In some implementations, the scheduling techniques disclosed herein improve processor scalability, with job execution time scaling nearly linearly with the addition of CPU resources. Schedulers assign CPUs to run new, short-running tasks from a unified new task queue, ensuring that each CPU is running the highest priority new tasks and maximizing CPU usage while unexecuted tasks are available. In some implementations, the multiprocessor system may associate one worker thread with each CPU, preventing CPU contention. In some implementations, tasks may be prioritized in a queue based on their task association (e.g., prioritize execution of child tasks generated by an executing parent task), speeding completion of currently running jobs.

Implementations of the described techniques may include hardware, firmware, software, or a combination thereof. Implementations can include methods, systems, and apparatus, including one or more computer-readable storage media encoded with executable instructions that, when executed by one or more processors, perform operations of the techniques disclosed herein. For example, the techniques may be implemented using multiple processors of a multiple processors of a multiprocessor system and one or more computer-readable media storing instructions that, when executed, cause the multiprocessor system to perform the indicated operations.

The details of one or more implementations are set forth in the accompanying drawings and the description below. Other features will be apparent from the description and drawings, and from the claims.

BRIEF DESCRIPTION OF THE DRAWINGS

FIGS. 6A through 6H are diagrams illustrating an example of task scheduling in a multiprocessor system.

FIG. 7 is a flow chart that illustrates an example process for task scheduling in a multiprocessor system.

Like reference numbers and designations in the various drawings indicate like elements.

DETAILED DESCRIPTION

Figure 1:
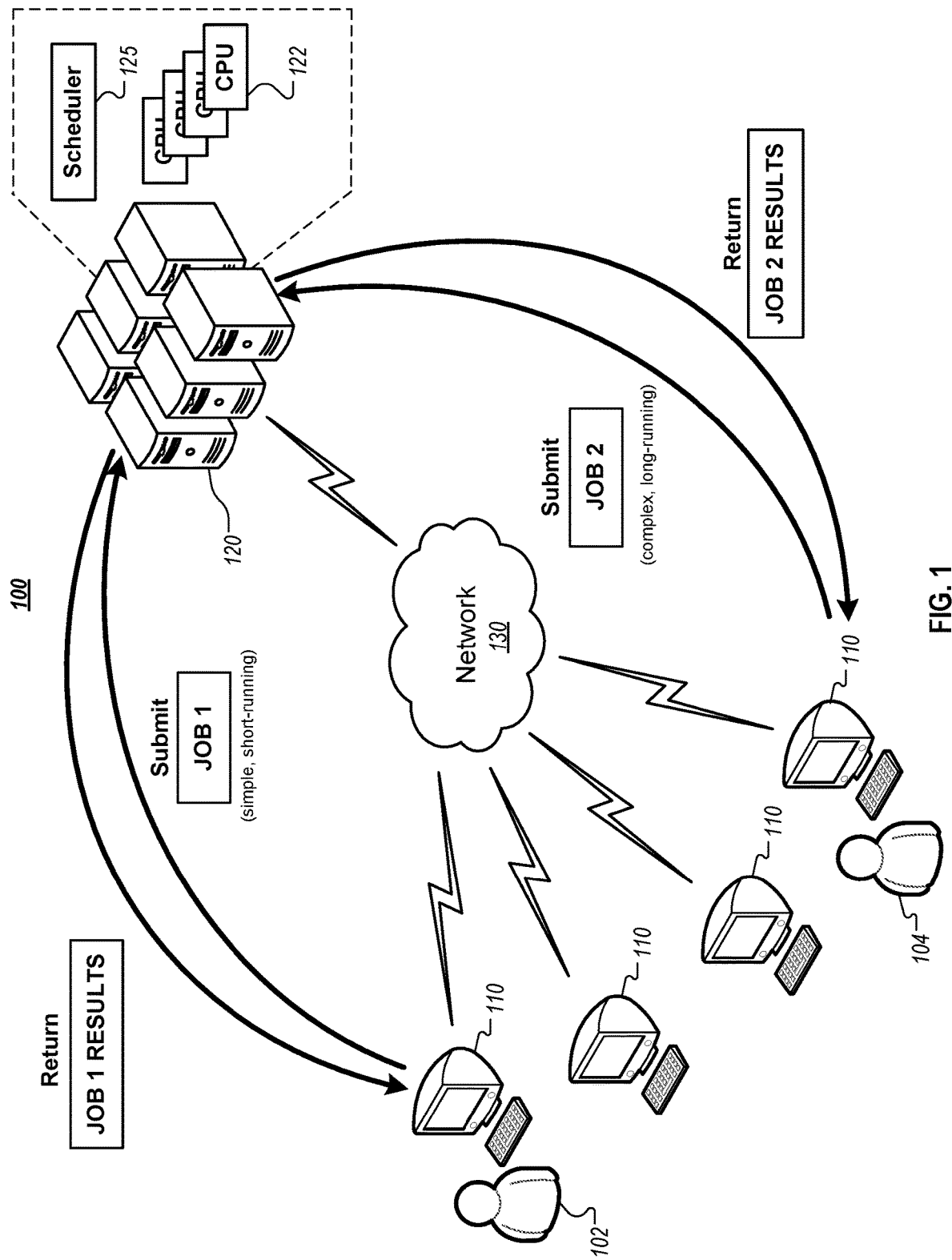
FIG. 1 is a diagram that illustrates an example system for task scheduling in a multiprocessor system.

FIG. 1 is a diagram that illustrates an example system 100 for task scheduling in a multiprocessor system. The system 100 includes one or more client devices 110 that communicate with a multiprocessor computing system 120. The users 102, 104 of the client devices 110 submit computing jobs to the multiprocessor system 120, the multiprocessor system executes tasks related to the jobs, then returns the results of the jobs to the client devices 110 after completion.

The system 100 includes a multiprocessor computing system 120. The multiprocessor system 120 may be, for example, one or more servers, computers, computing clusters, mainframe computers, personal computers (PCs), or other computing device(s) that process data. In some implementations, the multiprocessor system 120 may be a high performance computer (HPC), a high performance computing cluster (HPCC), a cloud computing system, or a supercomputing system. In some implementations, the multiprocessor system 120 may be a single computer with multiple CPUs. In other implementations, the multiprocessor system 120 may a system of more than one computer.

The multiprocessor system 120 includes multiple CPUs 122. The multiple CPUs 122 may be part of a single computer or may be distributed across multiple computers. Each of the multiple CPUs 122 processes information by executing tasks, which, for the purposes of this disclosure, are considered to be discrete processing work units. As used herein, the term "CPU" refers generally to a hardware processing unit, and may refer to a processing core of a multi-core processor chip, an execution unit of a graphics processing unit (GPU), or other processing element. Thus, different execution units on a single chip may be scheduled and used as different CPUs, as can the execution units of GPUs and other processing devices.

The multiprocessor system 120 includes one or more resource schedulers 125. The resource scheduler 125 performs a variety of functions, including managing, prioritizing, and scheduling tasks, assigning tasks to execute on a particular CPU 122, and coordinating the processing activities of the multiple CPUs 122.

In some implementations, the multiprocessor system 120 may have multiple schedulers 125. For example, the system 120 may have a master scheduler that maintains task queues, while one or more CPU schedulers manage task assignments to individual CPUs. In some examples, each CPU in the multiprocessor system 120 may have a dedicated CPU scheduler. Though the operations described throughout this disclosure are attributed to a single scheduler 125, it should be understood that the operations may be performed by any combination of one or more schedulers 125 of the multiprocessor system.

The scheduler 125 may manage tasks in the multiprocessor system 120 to achieve or balance any of various objectives, including maximizing task throughput, minimizing latency or response time, and balancing workload. In some implementations, the resource scheduler 125 may be implemented at the user-level, such that different scheduling policies can be applied without modifying the operating system of the multiprocessor system 120.

In some implementations, the scheduler 125 operates in a user mode or application mode, separate from and running on top of an operating system which has its own thread and process scheduling functionality. Nevertheless, the same techniques could be applied for management of resources at a hardware level or by an operating system.

The multiprocessor system 120 communicates with one or more client devices 110. The client devices 110 may be, for example, any of personal computers, work stations, tablets, mobile phones, personal digital assistants (PDAs) or other computing device. The client devices 110 are not necessarily of the same type of device, e.g. one client device 110 may be a workstation, while another client device 110 may be a mobile phone. The client devices 110 may be collocated, or may be distributed in location, e.g. at different geographic sites.

The client devices 110 include a means for a user 102, 104 to input and receive data. For example, the client devices 110 may include an LCD or CRT display for viewing data, and a keyboard, mouse, or keypad for the user to 102, 104 to input data to the client device 110. The client devices 110 may include voice recognition capabilities to process spoken commands.

The client devices 110 electronically exchange data with the multiprocessor system 120, possibly through a network 130. The network 130 may be any combination of wired and wireless networks and may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. The network 130 may include multiple networks or subnetworks. The network 130 may also include a circuit-switched network, a packet-switched data network, or any other network able to carry electronic communications (e.g., data or voice communications). For example, the network 130 may include networks based on the Internet protocol (IP), asynchronous transfer mode (ATM), the PSTN, packet-switched networks based on IP, X.25, or Frame Relay, or other comparable technologies. The network 130 may include one or more networks that include wireless data channels and wireless voice channels. The network 130 may include a broadband network.

In the system 100, the user 102 submits a job (Job 1) to the multiprocessor system 120 though a client device 110. Here, a job is a particular computational process that a user desires the multiprocessor system 120 to complete. A job may represent an action requested by a user. Job 1 may be, for example, generating a document, performing a data analysis, processing a data set, or generating a data visualization. In some implementations, Job 1 may be a batch job (e.g., a series of jobs that execute sequentially). In some implementations, a computer or other device, rather than or independent of a user, may submit a job to the multiprocessor system 120.

Job 1 may be subdivided into tasks, which are discrete processing work units that may be executed by a CPU. Different tasks may have different durations (e.g., the CPU processing time required to complete task). For example, some tasks may be short-running, where they complete within a predetermined execution time, while other tasks may be long-running, where they require more than the predetermined execution time to complete. The duration of a task may depend on multiple factors, including the memory operations required by the task, the input/output (I/O) operations required by the task, and whether the task generates any sub-tasks (e.g., child tasks) that must be executed before the originating (e.g., parent task) completes. When the multiprocessor system 120 receives Job 1, the resource scheduler 125 adds the tasks of Job 1 to a task queue and schedules them for execution. When the CPUs complete any currently executing tasks, they may begin executing the new Job 1 tasks. When the CPUs 122 have completed all tasks associated with Job 1, the multiprocessor system 120 returns the results of Job 1 to the user 102.

In some implementations, the multiprocessor system 120 may have tasks related to more than one job awaiting execution. In example system 100, the multiprocessor system 120 receives two jobs, Job 1 and Job 2, from two users, user 102 and user 104, respectively, where both jobs are awaiting execution. In some cases, the tasks associated with Jobs 1 and 2 may be assigned different priorities. For example, tasks associated with Job 1 may be considered "normal" priority, while tasks associated with Job 2 may be considered "high" priority. Task priority may be determined based on any of various factors, including user or job association, task type, job type, task runtime, task submission timestamp, resource requirements, or another factor. For example, all jobs submitted by a standard user may be designated "normal" priority, while jobs submitted by a priority user (e.g., a CEO, a network administrator) may be designated "high" priority. As discussed below, the resource scheduler 125 may automatically set and adjust priority levels for tasks, even dynamically adjusting priority levels for previously submitted jobs and currently executing or waiting tasks. For example, the scheduler 125 can identify the user associated with each job and its component tasks, access organization records to look up the role of the user in an organization, and use priority assignment data to map the role to priority level. In some instances, the priority assignment can take into account other factors, such as credentials or permissions of users, the departments the users work in within an organization, the type of task or job, and so on.

Generally, different submitted jobs can require different types or quantities of computing resources for completion. For example, some jobs may be simple jobs that are composed of a relatively small number of tasks, where the tasks generally require relatively few CPU processing cycles for completion. Simple jobs also may contain relatively few memory or I/O operations. Such simple jobs may be considered "short-running" jobs, which could complete relatively quickly with comparatively few resources. Other jobs may be complex jobs that are composed of a relatively large number of tasks, where some or many of the tasks may require many processing cycles for completion. Complex jobs also may contain many memory calls, I/O operations, or other time-consuming operations. Such complex jobs may be considered "long-running" jobs, which require comparatively more resources to complete. In example system 100, Job 1 is a complex, long-running job, while Job 2 is a simple, short-running job.

The resource scheduler 125 determines the task execution order and assigns tasks to run on the multiple CPUs 122 according to a scheduling policy. The resource scheduler may implement scheduling policies to accomplish any combination of various objectives, including maximizing resource utilization, maximizing task throughput, minimizing task latency, minimizing job response time (i.e., the time between when a user submits a job and when the multiprocessor system 120 returns the results of that job), balancing workload, or other objective. In some situations, optimizing job response time when the workload consists of a mixture of simple, short-running jobs and complex, long-running jobs can be particularly challenging.

The scheduling techniques of the present disclosure balance execution of simple, short-running jobs and complex, long-running jobs by designating one subset of CPUs 122 to preferentially run new or short-running tasks and a second subset of CPUs 122 to preferentially run suspended, long-running tasks. By dedicating computing resources to preferentially process either new or suspended tasks, the multiprocessor system 120 can balance the completion of simple and complex jobs, limiting the task blocking that can unnecessarily delay the completion of both simple jobs (e.g., the convoy effect, where several long-running tasks monopolize CPU resources and prevent short-running tasks from running) and complex jobs (e.g., starvation, where a high volume of short-running tasks prevent long-running tasks from running). Furthermore, the multiprocessor system 120 can dynamically change the number of CPUs designated to each subset, e.g., by an administrator or algorithm, such that the proportion of new task CPUs and long-running task CPUs can be adjusted to account for the current or expected workload, users, or other factors.

The scheduling techniques of the present disclosure avoid challenges that arise in some commonly implemented scheduling policies. As an example, a first come first served (FCFS) scheduling policy assigns tasks to run on CPUs in the order that the tasks arrive in the queue. In the example system 100, if complex, long-running Job 1 arrives before simple, short-running Job 2, the multiprocessor system 120 may not begin processing simple Job 2 until all tasks related to complex, long-running Job 1 complete, leading to an undesirably long response time for Job 2. Furthermore, if additional jobs arrive in the queue while the long-running tasks of Job 1 are executing, a backlog of unexecuted new tasks may build-up in the queue (i.e., the convoy effect). In the present technique, by suspending long-running tasks when necessary and designating a subset of CPUs to run new or short-running tasks, the system can limit the build-up of new, unexecuted tasks in the queue.

As another example, a shortest job first (SJF) scheduling policy requires the scheduler to estimate the processing time required to complete a job and prioritizes execution of those jobs estimated to have the shortest processing time. In this case, in example system 100, if multiple additional simple, short-running jobs arrive while complex, long-running Job 1 tasks are awaiting execution, the completion of Job 1 may be undesirably delayed (i.e., starvation). In the present technique, by designating a subset of CPUs to run suspended or long-running tasks, the system can ensure that complex, long-running jobs complete in a timely manner, even when many new, short-running tasks are waiting in the queue.

Figure 2:
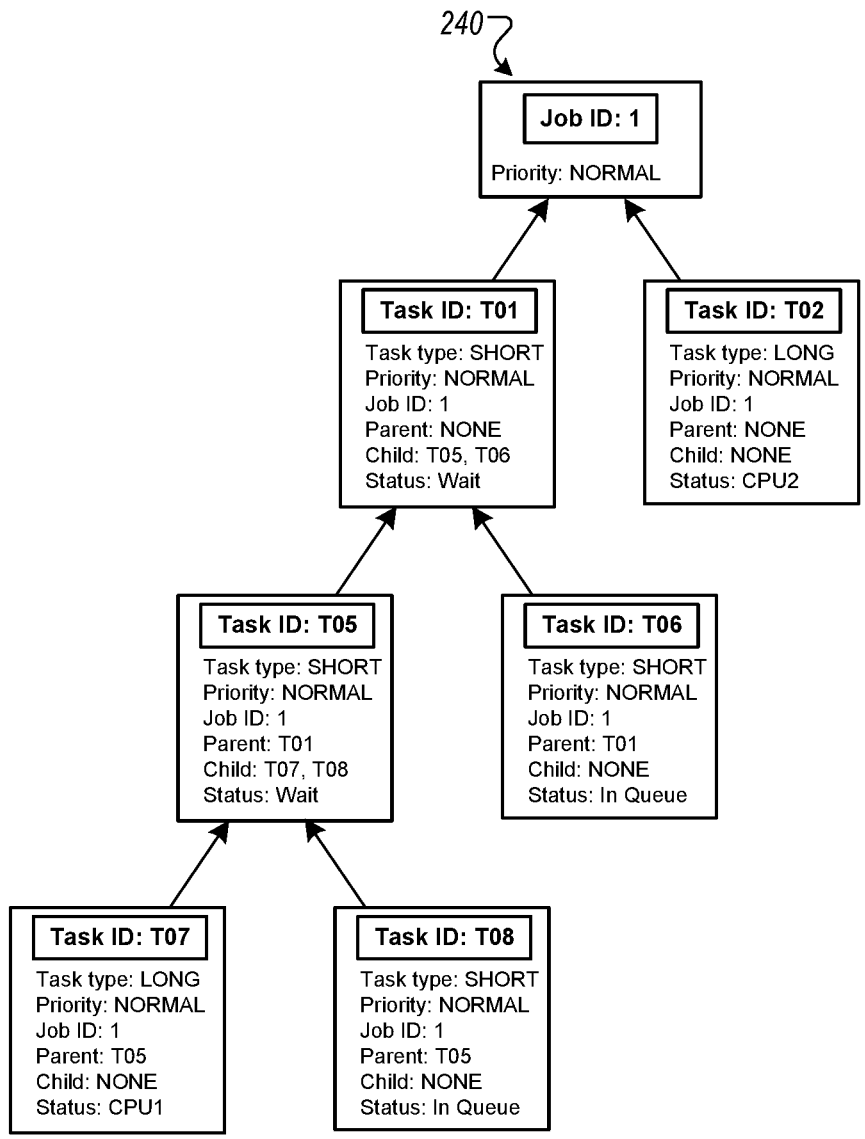
FIG. 2 is a diagram that illustrates an example of a task hierarchy related to a job processed by a multiprocessor system.

FIG. 2 is a diagram that illustrates an example of a task hierarchy related to a job processed by a multiprocessor system. A job consists of one or more tasks, each of which is a discrete processing unit that may be executed by a CPU. Once a CPU begins to execute a task, the task may generate additional dependent tasks (e.g., child tasks), where all child tasks must complete before the originating task (e.g., the parent task) can complete. Child tasks may generate additional child tasks, which must complete before their parent tasks can complete, etc. In some implementations, a task may be characterized by various properties. Those properties may include, for example, job association, classification, e.g., short-running ("short") or long-running ("long"), scheduling priority, relationship to other tasks, execution status, as well as other properties. FIG. 2 represents a snapshot in time.

FIG. 2 depicts Job 1 (240), designated "normal" priority. The job's priority may be assigned, for example, by a resource scheduler and may be based on the type of job, the user submitting the job, or other priority criteria. In this example, all tasks related to Job 1 carry the Job 1 priority (normal), though in other examples, task priority may be assigned based on other factors. Job 1 is initially divided into two tasks, T01 and T02. Prior to task execution, all new tasks are considered to be short-running, as indicated in FIG. 2 ("Short"). Because tasks T01 and T02 are the top-level tasks associated with Job 1, they have no parent task. In the example of FIG. 2, Job 1 is being processed by a multiprocessor system with two CPUs, CPU 1 and CPU 2, and a single task queue maintained by a scheduler.

Initially, the scheduler assigns CPU 1 to run task T01 and CPU 2 to run task T02. During execution, task T01 generates child tasks T05 and T06. Because these are new tasks, the scheduler classifies them as short-running tasks and adds them to the front of the task queue. Because parent task T01 cannot continue until tasks T05 and T06 complete, the scheduler reassigns CPU 1 to run child task T05, which was at the front of the task queue. Task T06 continues to wait in the queue, while task T02 continues to run on CPU 2.

During execution, task T05 running on CPU 1 generates child tasks T07 and T08. Because they are new tasks, the scheduler classifies T07 and T08 as short-running and places them at the front of the queue. Because task T05 cannot continue until tasks T07 and T08 complete, the scheduler reassigns CPU 1 to run task T07, which was at the front of the task queue. Tasks T06 and T08 continue to wait in the queue, while task T02 continues to run on CPU 2.

In the systems and techniques of the present disclosure, the scheduler keeps track of one or more predetermined maximum execution time limits (e.g., time thresholds or time units). If the scheduler determines that a task has executed on a CPU for more than one time unit, the scheduler may reclassify that task as a long-running task. In the example of FIG. 2, the scheduler determines that task T02 has run on CPU 2 for at least one time unit without completing and thus reclassifies task T02 as a long-running, as indicated in FIG. 2 ("Long").

Figure 3:
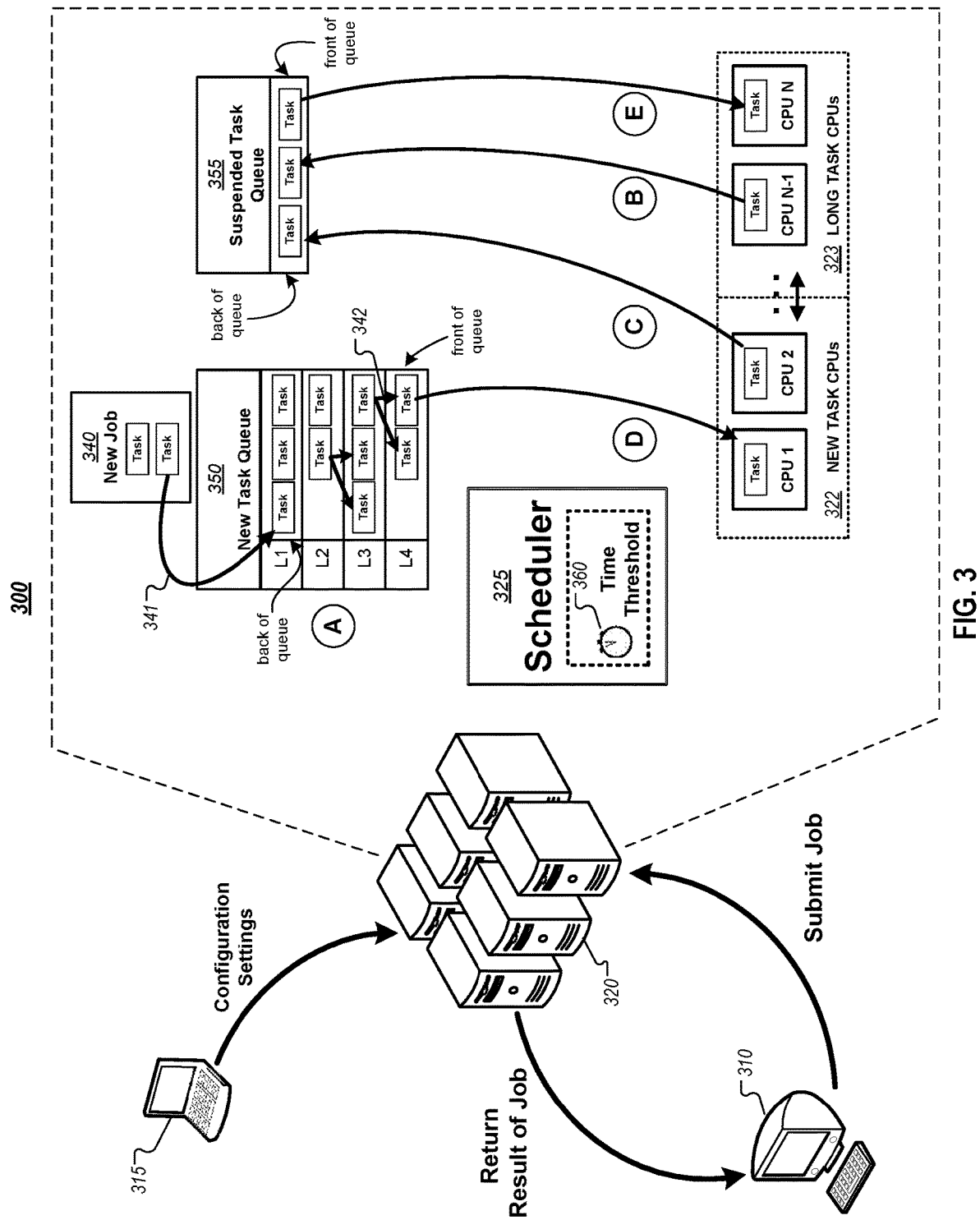
FIG. 3 is a diagram that illustrates an example system for task scheduling in a multiprocessor system.

FIG. 3 is a diagram that illustrates an example system 300 for task scheduling in a multiprocessor system. The system 300 includes a multiprocessor system 320 that includes multiple subsets of CPUs 322, 323. The system 300 also includes a client device 310 and an administrator device 315, both of which communicate with the multiprocessor system 300, possibly through a network.

In the example of FIG. 3, the CPUs are partitioned into one subset designated to preferentially run new tasks (the new task CPUs 322) and a second subset designated to preferentially run suspended, long-running tasks (the long task CPUs 323). The scheduler 325 of the multiprocessor system 320 manages two task queues, a new task queue 350 and a suspended task queue 355, and assigns tasks from those queues to run on the short task CPUs 322 and the long task CPUs 323. The scheduler 325 also keeps track of one or more predetermined maximum execution times, e.g., a time unit 360. If the scheduler 325 determines that a task has been executing for at least one time unit, it may reclassify the task as long-running, and suspend the task. The scheduler 325 may then assign a different task to run on the CPU.

System 300 includes a multiprocessor system 320, which may be similar to the multiprocessor system 120 of FIG. 1. The multiprocessor system 120 may be, for example, one or more servers, computers, computing cluster, mainframe computer, personal computers (PC), or another computing device that processes data. In some implementations, the multiprocessor system 320 may be a high performance computer (HPC), a high performance computing cluster (HPCC), a cloud computing system, or a super-computing system. The multiprocessor system 320 may include a single computer or multiple computers.

The system 300 also includes one or more client devices 310. The client device 310 may be, for example, any of personal computers, work stations, tablets, mobile phones, personal digital assistants (PDAs) or other computing device that exchanges electronic information with the multiprocessor system 320. In some implementations, the client device 310 may exchange electronic information with the multiprocessor system 320 through a network. The client device 310 may be configured to send a job submitted by a user of the client device 310 to the multiprocessor system 320. The multiprocessor system 320 may then process the job and return the results of the job to the client device 310.

The multiprocessor system 320 includes N CPUs (i.e., N cores) that are partitioned into two subsets of CPUs, with one subset designated new task CPUs 322 and the second subset designated long task CPUs 323. N can be any integer number of CPUs (e.g., a dual core system with N=2 CPUs, a quad core system with N=4 CPUs, etc.), and each CPU is designated to only one subset. The CPUs may be allotted to the new task CPUS 322 or long task CPUs 323 in any proportion. For example, in an eight-core multiprocessor system 320, four CPUs may be assigned to be new task CPUs 322, while the remaining four CPUs are assigned to be long task CPUs 323. In some implementations, the assignment of CPUs to a particular subset may be determined by configuration settings stored in a memory of the multiprocessor system 320.

The settings of the system 300 may be adjusted by an administrator system 315. The administrator system 315 may, for example, represent a user account with administrative privileges that enable a user to modify parameters that are not accessible to other users. In some examples, the administrator system 315 may provide configuration settings to the multiprocessor system 320 that determine or adjust the designation of CPUs to the new task CPU subset 322 and the long task CPU subset 323. For example, the administrator 315 may provide a setting that allocates the multiple CPUs 322, 323 between new task CPUs 322 and long task CPUs 323 (e.g., 60% of the CPUs are new task CPUs 322 and 40% of the CPUs are long task CPUs). In some implementations, the system administrator may assign a specific CPU to a particular subset of CPUs (e.g., CPU 1 is assigned as a new task CPU 322).

In some implementations, multiprocessor system 120 may change the allotment of CPUs between new task CPUs 322 and long task CPUs 323. For example, the administrator system 315 may change the allotment of CPUs to new or long task execution when the expected workload balance changes (e.g., assign more CPUs to the long task CPUs 323 when the workload projection includes more long-running tasks).

In some implementations, the allotment of CPUs between new task CPUs 322 and long task CPUs 323 may be configured by an algorithm or automated technique. For example, the allotment of CPUs between new task CPUs 322 and long task CPUs 323 may change based on the CPU workload, the time of day, input from a system administrator, or another condition.

The multiprocessor system 320 also includes a resource scheduler 325. The resource scheduler 325 manage the scheduling of tasks within the multiprocessor system 320 and coordinates the processing activities of the CPUs. The scheduler 325 may be implemented in software, that is, as a set of instructions stored in a memory system of the multiprocessor system 320 that, when executed, cause the multiprocessor system 320 to perform the various operations described. In some examples, the scheduler 325 may be implemented at the user-level, enabling application of different scheduling policies without modifying the operating system of the multiprocessor system 320. In some examples, there may be one or more schedulers that perform the operations performed by the scheduler 325 described herein (e.g., a scheduler for each CPU). FIG. 3 includes operations (A) through (E), which represent different actions the scheduler 325 may perform. In some implementations, the scheduler 325 may perform one or more of operations (A) through (E) in response to a detected event (e.g., arrival of a new task, completion of a task, time-out of a task, etc.).

In system 300, the scheduler 325 maintains two task queues, a new task queue 350 and a suspended task queue 355. The new task queue 350 manages execution order for new and short-running tasks, which are those tasks that have not been suspended. New tasks may be newly-arrived (e.g., as part of a new submitted job) or newly-generated (e.g., child tasks generated by currently executing parent tasks). All new tasks are initially designated by the scheduler 325 as short-running tasks.

In some implementations, the new task queue 350 may be multi-level. In system 300, the new task queue has four levels, L1 through L4, though in general, the new task queue may have any number of levels (e.g., 1 level, 6 levels, etc.). In this example, the deepest level of the queue, L4, is considered the front of the queue, while the shallowest level, L1, is considered the back of the queue, as indicated in FIG. 3. Accordingly, when assigning a CPU to run a task from the new task queue 350, the scheduler 325 assigns tasks starting at the front of the deepest occupied level of the queue 350.

Based on detecting that a new task has arrived (e.g., a new task related to a new job 340) or has been generated (e.g., a child task generated by a parent task), the scheduler 325 may add the new task to the new task queue 350, as show in operation (A). In some implementations, the scheduler 325 positions the task in the new task queue 350 based on whether the task is newly-arrived or newly-generated.

For example, in system 300, the scheduler 325 adds a newly-arrived task to the back of the first queue level, L1 as shown by arrow 341, effectively placing the task at the back of the new task queue 350. In contrast, the scheduler 325 adds a newly-generated child task to the back of the queue level one deeper than that of the parent task. In FIG. 3, an executing task originally in level L3 of the new task queue 350 generates two new child tasks. The scheduler 325 adds the two new child tasks to the back of the next level queue, L4, as shown by arrow 342. Because L4 was empty, the tasks are effectively placed at the front of the level L4 queue. Because the scheduler 325 assigns new tasks for execution starting at the deepest occupied level of the queue, adding newly-generated tasks to the back of the next-deepest level queue places those tasks at or near the front of the queue. In this way, the scheduler 325 prioritizes execution of child tasks related to currently-running parent tasks over execution of tasks related to new jobs.

In addition to maintaining the new task queue 350, the scheduler 355 also maintains the suspended task queue 355. The suspended task queue 355 manages execution order for suspended tasks, which are those tasks that began executing on a CPU, but which did not complete after running for a predetermined execution time. Based on determining that the task did not complete after running for the predetermined execution time, the scheduler 325 suspends the task and assigns the CPU to run another task. In system 300, the suspended task queue 355 has a single level, with the front and back of the queue as indicated in FIG. 3.

The scheduler 325 may suspend a task from running when it determines that the task has run on a CPU for at least a predetermined maximum execution time without completing. In some implementations, the scheduler 325 may keep track of a predetermined maximum execution time limit, e.g., a time unit 360, for each task. The time unit 360 may generally range from milliseconds to hundreds of seconds. In some implementations, the time unit may 360 may be on the order of twenty seconds. The time unit 360 may be configurable by an administrator system 315, a user of client device 310, or an algorithm. When the scheduler 325 detects that a task running on a new task CPU 322 or a long task CPU 323 has been executing on that CPU for longer than one time unit 360, the scheduler 325 may suspend the task, add the task to the end of the suspended task queue 355, and assign the CPU to execute another task from the front of one of the queues. In some examples, the scheduler 325 determines that a task has run on a CPU for at least one time unit without completing by tracking the time elapsed from when a CPU began running a particular task or by detecting a task time-out event. In some implementations, the scheduler 325 may use time units of different durations for different CPUs, e.g., a time unit 360 of a first length for tasks running on new task CPU 322s and a time unit 360 of a second length for tasks running on long task CPUs 323.

Operations (B) and (C) show examples of the scheduler 325 suspending currently running tasks from a long task CPU 323 and a new task CPU 322, respectively. Here, the scheduler 325 applies the same execution time limit, or the same time unit 360 duration, for tasks running on all CPUs 322, 323. In operation (B), the scheduler 325 determines that the task running on the long task CPU N–1 has executed for more than the time unit 360 without completing. As a result, the scheduler 325 classifies the task as long-running, suspends it, and adds it to the back of the suspended task queue 355. Similarly, in operation (C) the scheduler 325 determines that the task running on the new task CPU 2 has executed for more than the time unit 360 without completing. As a result, the scheduler 325 classifies the task as long-running, suspends it, and adds it to the back of the suspended task queue 355.

The scheduler 325 may suspend a task by any of various methods. In some implementations, the scheduler 325 may lower the priority of a thread to suspend the task associated with that thread, for example, by using the SetThreadPriority application programming interface (API) in Windows-based systems. In these cases, the scheduler 325 can then resume running the suspended task by raising the priority of the thread. In some implementations, the scheduler 325 may suspend a task by implementing a custom or user-defined event, a notification, or an inter-process communication (e.g., SIGUSR signal or other signal handler in POSIX-compliant systems).

In some implementations, the master scheduler 325 may suspend a task from a long task CPU 323 only if there is a higher priority task in the suspended task queue 355. For example, if there is no task in the suspended task queue 355 with higher priority than the currently running task, the master scheduler 325 may allow the task to continue to run on the long task CPU 323. However, if there is a higher priority task in the suspended task queue, the master scheduler 325 may suspend the task, add it to the back of the suspended task queue 355, and assign the long task CPU 323 to run the higher priority task in the suspended task queue 355.

In addition to managing the task queues, based on detecting that the previous task running on a CPU has been completed or suspended, the scheduler 325 assigns the CPU to execute another task. In some implementations, the scheduler 325 may assign a CPU to run a particular task based on whether the CPU is a new task CPU 322 or a long task CPU 323.

In some implementations, the scheduler 325 preferentially assigns a new task CPU 322 to execute the next unexecuted task from the new task queue 350. In example system 300, the scheduler 325 assigns the new task CPU 322 to run a task starting at the front of the deepest occupied level of the new task queue 350. By assigning tasks in deeper levels of the queue (e.g., child tasks generated by already-running tasks) to be run before tasks in the first level of the queue (e.g., tasks from new jobs), the scheduler 325 effectively prioritizes completing currently running jobs rather than beginning to execute new jobs. If there are no unexecuted tasks in the new task queue 350, the scheduler 325 may assign the new task CPU 322 to resume running the next suspended task from the front of the suspended task queue 355.

Similarly, in some implementations, the scheduler 325 preferentially assigns a long task CPU 323 to resume running the next suspended task from the front of the suspended task queue 355. If there are no available tasks in the suspended task queue 355, the scheduler 325 may assign the long task CPU 323 to run the next unexecuted task from the front of the new task queue 350.

An example of task assignment to a new task CPU 322 is shown in operation (D). Based on detecting that the task previously running on CPU 1 has completed or been suspended, the scheduler 325 assigns CPU 1 to run another task. As shown in operation (D), because CPU 1 is a new task CPU 322, the scheduler 325 assigns it to run the next unexecuted task from the front of the deepest occupied level (L4) of the new task queue 355.

An example of task assignment to a long task CPU 323 is shown in operation (E). Based on detecting that the task previously running on CPU N has completed or been suspended, the scheduler 325 assigns CPU N to run another task. As shown in operation (E), because CPU N is a long task CPU 323, the scheduler assigns it to resume running the next task from the front of the suspended task queue 355.

In some implementations, the scheduler 325 may assign a CPU to run a task based on the parent-child task relationship of a task currently running on the CPU. For example, if a CPU is running a task that generates a child task, the scheduler 325 may assign the CPU to run the child task, while keeping the parent task on the worker thread memory stack. Because a child task is likely to require access to the same memory values as a parent task, retaining the parent task memory stack may reduce time-consuming data access operations. Because the parent task is already in the worker thread stack, the parent task will automatically resume execution once all child tasks are complete.

Generally, the operations (A) through (E) may occur synchronously or asynchronously. These operations may occur in various orders depending upon the arrival, completion, and complexity of the tasks for the particular job or set of jobs being processed by the multiprocessor system.

Figure 4:
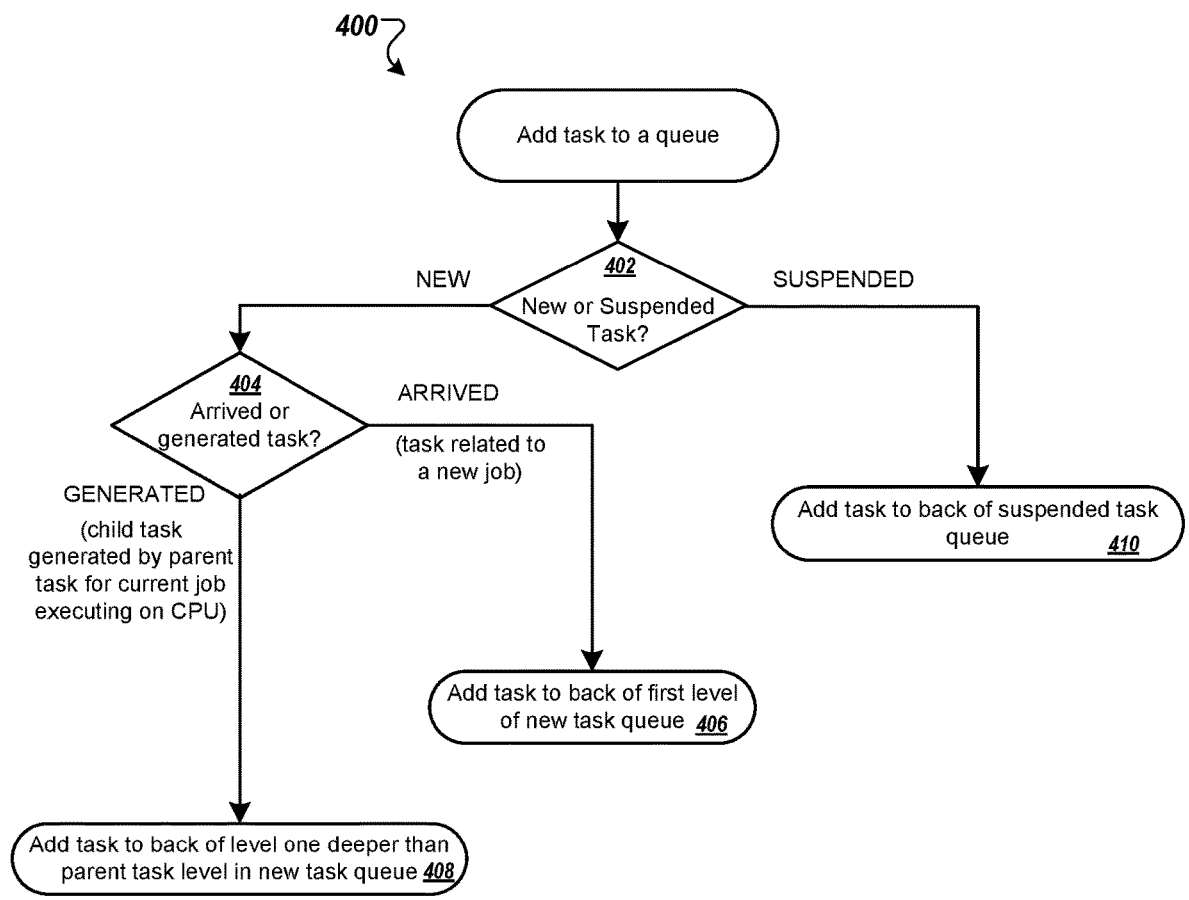
FIG. 4 is a flow chart that illustrates an example of queue management for task scheduling in a multiprocessor system.

FIG. 4 is a flow chart that illustrates an example 400 of queue management for task scheduling in a multiprocessor system. The example 400 applies to a multiprocessor system such as that in example 300 of FIG. 3. In example 400, when the scheduler detects that a task is newly-arrived, newly-generated, or recently suspended, the scheduler will update the task queues by adding the newly-arrived, newly-generated, or recently-suspended task to a position in the new task queue or the suspended task queue.

When the scheduler detects the arrival or generation of a new task, it will add the task to the new task queue. In some implementations, the scheduler's placement of a new task in the new task queue may be based on whether the task is newly-arrived (e.g., a task related to a new job) or newly-generated (e.g., a child task generated by a parent task of a currently executing job) (404). In example 400, the scheduler adds newly-arrived tasks to the back of the first level of the new task queue (406). In a system where the scheduler assigns CPUs to execute tasks starting from the deepest level of the new task queue, this has the effect of placing newly-arrived tasks at the end of the queue.

In example 400, the scheduler adds newly-generated child tasks to the back of the queue level one level deeper than the parent task's level (408). For example, if a parent task in the third level (L3) of the new task queue generates a new child task, the scheduler may add the newly-generated child task to the fourth level (L4) of the new task queue. In a system where the scheduler assigns CPUs to execute tasks starting from the deepest level of the new task queue, this has the effect of placing newly-generated tasks near, or at, the front of the queue.

In some examples, the master scheduler may place a new task in a position in the queue based on other properties of the task. For example, the scheduler may place a new task in a queue position based on the priority of the new task relative to those already in the queue (e.g., placing a higher priority new task before lower priority tasks already waiting in the queue). In some implementations, the scheduler may place a new task in a queue position based on its job or task association (e.g., placing a child task generated by a currently running parent task ahead of tasks related to suspended tasks).

The scheduler will add suspended tasks to the suspended task queue. In example 400, the suspended task queue is a single level and the scheduler adds a newly-suspended task to the back of the suspended task queue (410).

Figure 5:
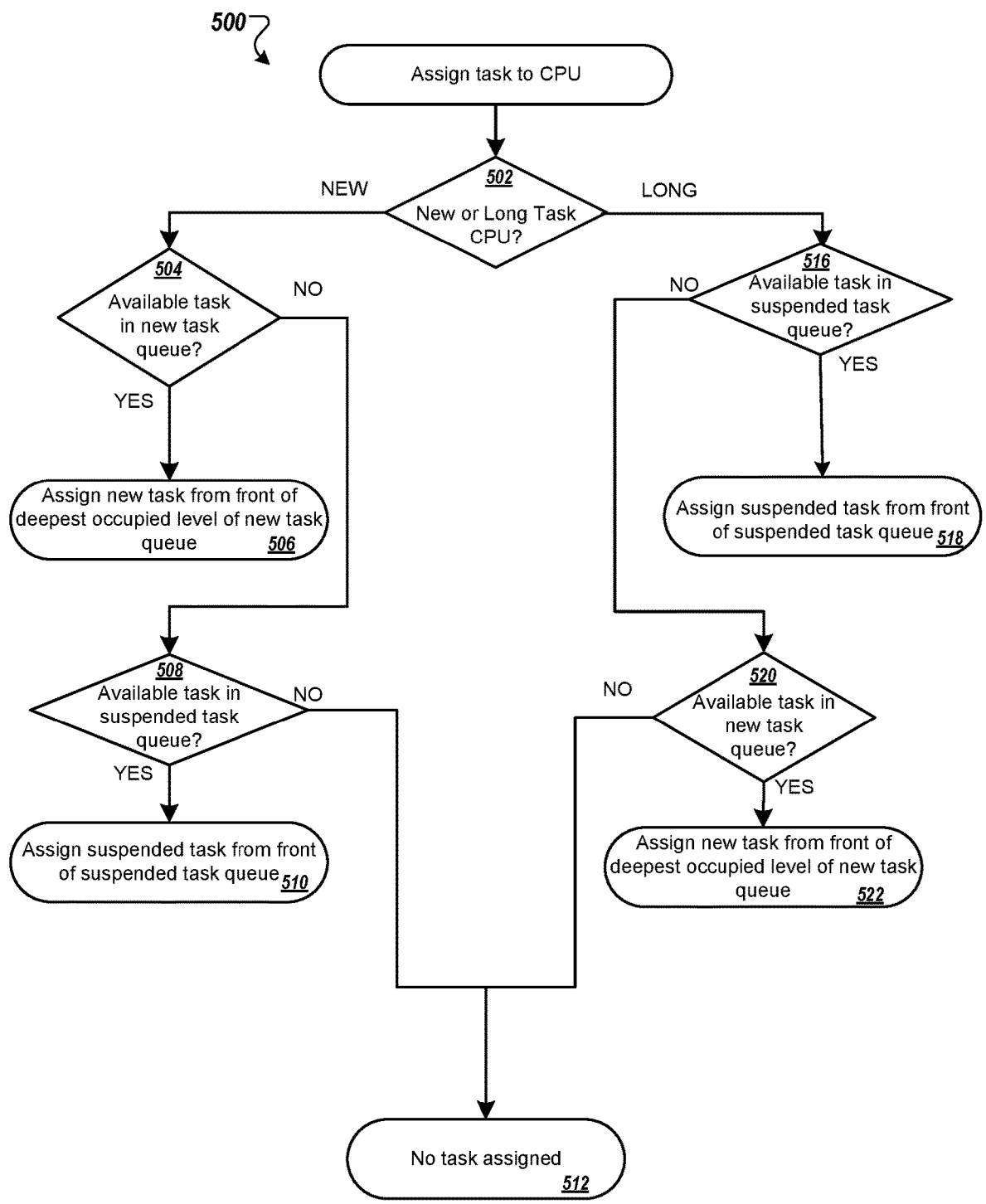
FIG. 5 is a flow chart that illustrates an example of CPU task assignment for task scheduling in a multiprocessor system.

FIG. 5 is a flow chart that illustrates an example 500 of CPU task assignment for task scheduling in a multiprocessor system. The example 500 applies to a multiprocessor system such as that in example 300 of FIG. 3. In example 500, when the scheduler detects that the previous task running on a CPU has completed or been suspended, the scheduler assigns the CPU to run another task. In some implementations, the scheduler may assign a task based upon whether the CPU is a new task CPU or a long task CPU (502).

For a new task CPU, if there is a new task available in the new task queue (504), the CPU scheduler assigns the CPU to run the next unexecuted new task from the front of the deepest occupied level of the new task queue (506). If there are no new tasks available in the new task queue, the scheduler assigns the new task CPU to resume running the next suspended task from the front of the suspended task queue (510). If there are no tasks available in either the new task queue or the suspended task queue, the CPU scheduler does not assign a task to the new task CPU, allowing it to remain idle (512). The scheduler may assign a task to an idle new task CPU when it detects that a task is available (e.g., a task arrives, is generated, or is suspended).

For a long task CPU, if there is a task available in the suspended task queue (516), the scheduler assigns the CPU to resume executing the next suspended task from the front of the suspended task queue (518). If there are no tasks available in the suspended task queue, the scheduler assigns the long task CPU to run the next unexecuted new task from the front of the deepest occupied level of the new task queue (522). If there are no unexecuted tasks available in the new task queue (520), the scheduler does not assign a task to the long task CPU, allowing it to remain idle (512). The scheduler may assign a task to an idle long task CPU when it detects that a task is available (e.g., a task arrives, is generated, or is suspended).

FIGS. 6A through 6H are diagrams illustrating an example 600 of task scheduling in a multiprocessor system. FIGS. 6A through 6H depict the execution of two jobs, Job 1 and Job 2, in a dual core multiprocessor system that implements the disclosed task scheduling techniques. The example of FIG. 6 applies to a system such as that in FIG. 3, and includes two CPUs (CPU 1 and CPU 2) and a scheduler. In example 600, by suspending long-running tasks and designating a CPU to preferentially run either new tasks or suspended tasks, the multiprocessor system is able to balance the completion of both short-running and long-running tasks, preventing task blocking and ensuring that Job 1 and Job 2 are both completed in a timely manner.

In the system of example 600, CPU 1 is designated as a new task CPU, which preferentially runs new, short-running tasks, while CPU 2 is designated as a long task CPU, which preferentially runs suspended, long-running tasks. To prevent CPU contention, CPU 1 and CPU 2 each maintain one worker thread, worker thread 1 and worker thread 2, respectively. The system also includes a master scheduler, which manages new or short-running tasks in the new task queue, manages suspended tasks in the suspended task queue, keeps track of a predetermined maximum execution time limit (e.g., the time unit), and assigns the CPUs to run particular tasks.

FIGS. 6A through 6H depict the operations of the scheduler, as well as the statuses of the new task queue, the suspended task queue, and the two CPUs at the end of eight consecutive time intervals. In this example, the time interval is set to equal the time unit (e.g., the predetermined maximum execution time). The operations of the scheduler are indicated by the arrows.

Also depicted in FIGS. 6A through 6H are the task hierarchies of the two jobs, Job 1 and Job 2, submitted to the multiprocessor system. The status of each task is indicated by the perimeter of the task: a dashed line perimeter indicates that the task is currently executing on either CPU 1 or CPU 2, a single solid line perimeter indicates that the task is in one of the queues or waiting for a child task to execute, and a double solid line perimeter indicates that the task has completed.

At the start of the example, the multiprocessor system is idle, with both the new task queue and the suspended task queue empty and neither CPU executing a task. During each time interval, the scheduler adds new tasks to the new task queue as they arrive or are generated, suspends tasks to the suspended task queue, and assigns CPUs to run tasks when the previous task running on it has completed or been suspended.

Figure 6A:
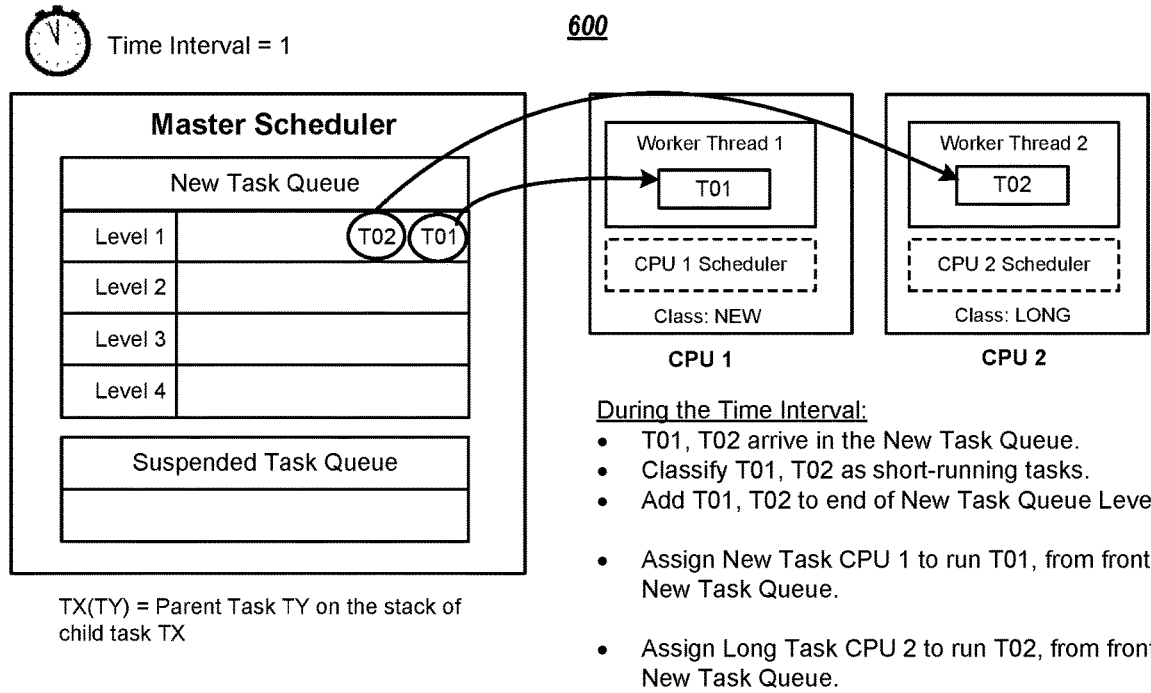
Figure 6A:
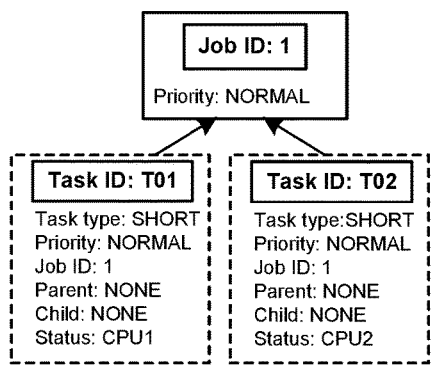

FIG. 6A depicts the status of the multiprocessor system at the end of time interval 1. During time interval 1, submitted Job 1, consisting of two tasks T01 and T02, arrived at the multiprocessor system schedulers. Because T01 and T02 are new tasks that have not yet begun execution, the scheduler classified them as short-running tasks and added both tasks to the end of the new task queue Level 1. Because both new task CPU 1 and long task CPU 2 were idle, the scheduler assigned them to run tasks T01 and T02, respectively. Though CPU 2 is a long task CPU that preferentially runs long tasks from the suspended task queue, because there were no tasks in the suspended task queue, the scheduler assigned it to run new task T02.

FIG. 6B depicts the status of the multiprocessor system at the end of time interval 2. During time interval 2, submitted Job 2, consisting of two tasks T03 and T04, arrived at the multiprocessor system schedulers. Because T03 and T04 are new tasks related to a new job, the scheduler classifies them as short-running tasks and adds them to the back of new task queue Level 1. Also during time interval 2, task T01, running on CPU 1, generated two child tasks, T05 and T06. Because T05 and T06 are new tasks generated by parent task T01, the scheduler classifies them as short-running tasks and adds them to the back of queue Level 2, which is one level deeper than the T01 queue level. As parent task T01 running on CPU 1 cannot complete until its child tasks complete, the scheduler assigns CPU 1 to run another task. Because CPU 1 is a new task CPU, the CPU 1 scheduler preferentially assigns it to run the task at the front of the deepest occupied level of the new task queue. Here, the scheduler assigns new task CPU 1 to run child task T05, while keeping the parent task T05 on the stack memory of its worker thread.

Also during time interval 2, CPU 2 completed execution of T02. Based on detecting that the task had completed, the scheduler assigned CPU 2 to execute another task. Because CPU 2 is a long task CPU, the scheduler prefers to assign it to resume running the next suspended task at the front of the suspended task queue. However, because there are no tasks in the suspended task queue, the scheduler assigned long task CPU 2 to run the next unexecuted task at the front of the deepest occupied level of the new task queue, which is task T06.

FIG. 6C depicts the status of the multiprocessor system at the end of time interval 3. During time interval 3, neither task T05 nor T06 completed after executing for one time unit. Based on determining that task T05 did not complete after executing for one time unit, the scheduler reclassified T05 as long-running, suspended it, and added it to the back of the suspended task queue (as the suspended task queue was empty, task T05 is effectively at the front of the queue). The scheduler then assigned CPU 1 to execute another task. Because CPU 1 is a new task CPU, the scheduler assigns it to run the next unexecuted task in the deepest occupied level of the new task queue, which is task T03.

Similarly, based on determining that task T06 did not complete after executing for one time unit, the scheduler reclassified T06 as long-running, suspended it, and added it to the back of the suspended task queue. The scheduler then assigned CPU 2 to run another task. Because CPU 2 is a long task CPU, the scheduler prefers to assign it to resume running suspended tasks from the front of the suspended task queue. In some cases, this may cause the scheduler to assign CPU 2 to resume running task T05, which was only recently (e.g., within one time unit) suspended. The system performance (e.g., job completion rate) may be improved, however, if the scheduler instead only resumes running a suspended task if the task has been suspended for a predetermined amount of time (e.g., one time unit). Here, because task T05 has not been suspended for one time unit, the scheduler assigns long task CPU 2 to run the next unexecuted task at the front of the deepest occupied level of the new task queue, which is task T04.

Figure 6D:
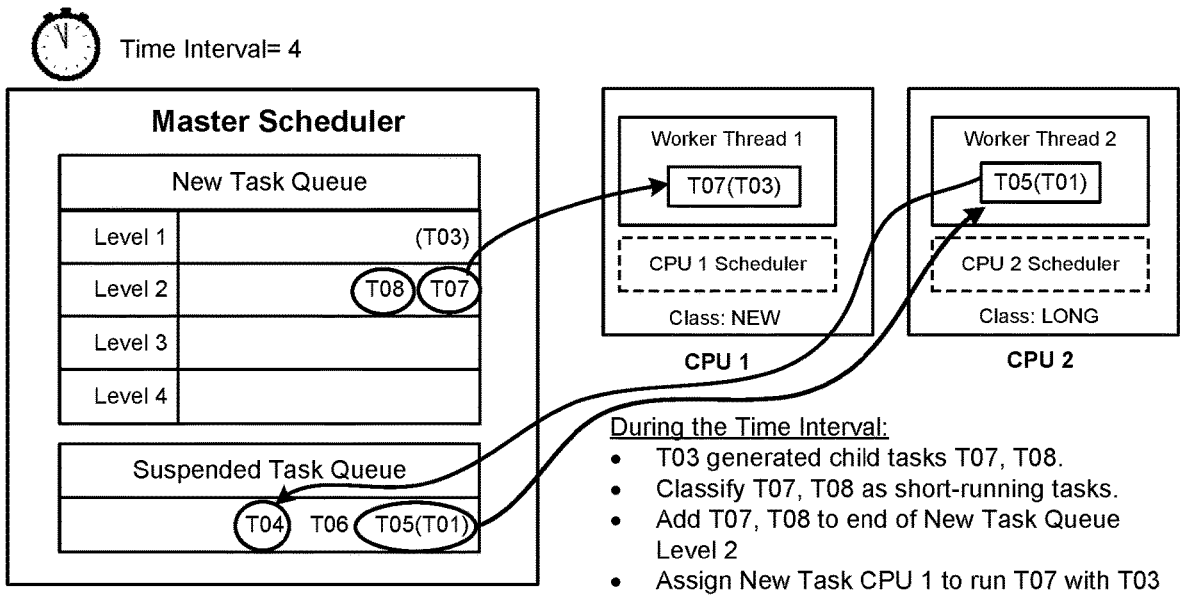
Figure 6D:
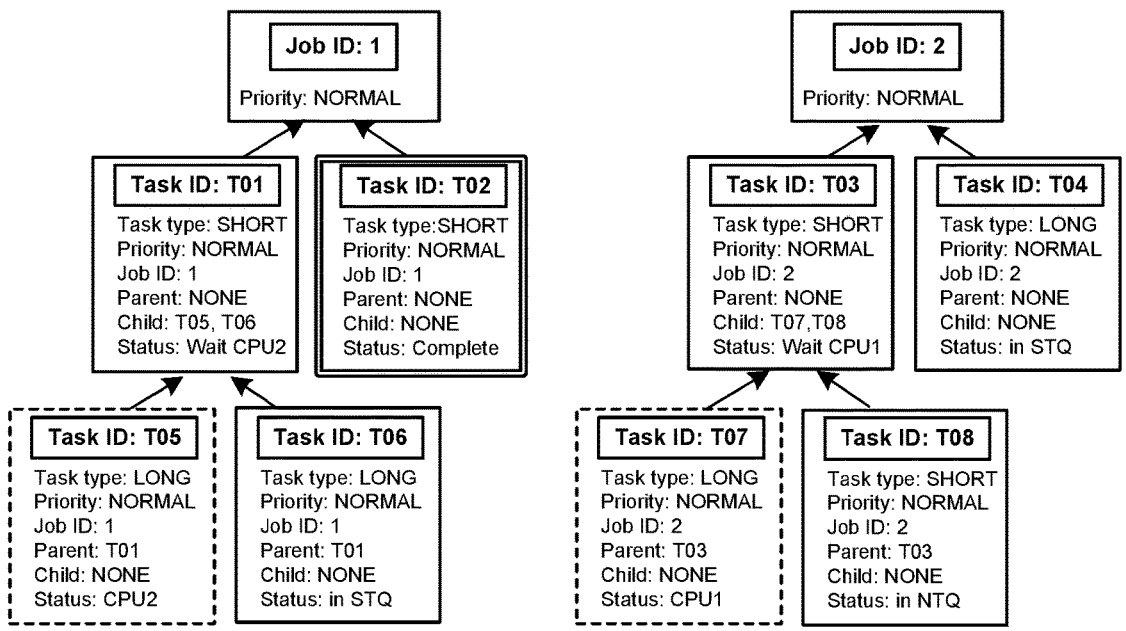

FIG. 6D depicts the status of the multiprocessor system at the end of time interval 4. During time interval 4, task T03 running on CPU 1 generated child tasks T07 and T08. The scheduler classified new child tasks T07 and T08 as short-running and, because parent task T03 was in new task queue Level 1, the scheduler added tasks T07 and T08 to the back of the next deepest queue level, Level 2. Because task T03 cannot complete until its child tasks have executed, the scheduler assigns CPU 1 to run child task T07, which is the next available new task from the deepest occupied level of the new task queue, while keeping task T03 on the memory stack of its worker thread.

During time interval 4, the scheduler determined that task T04 did not complete after executing on CPU 2 for at least one time unit. Because task T04 was a short-running task that did not complete within the predetermined execution time, the scheduler reclassified the task as long-running, suspended it, and added it to the back of the suspended task queue. The scheduler then assigned CPU 2 to run another task. Because CPU 2 is a long task CPU, the scheduler assigned it to resume running task T05, which has now been suspended for more than one time unit, from the front of the suspended task queue.

FIG. 6E depicts the status of the multiprocessor system at the end of time interval 5. Based on determining that task T07 did not complete after executing for at least one time unit, the scheduler reclassified T07 as long-running, added it to the end of the suspended task queue, and assigned CPU 1 to run another task. Because CPU 1 is a new task CPU, the scheduler assigned it to run task T08 from front of the deepest occupied level of the new task queue.

During time interval 5, the scheduler also determined that task T05 running on CPU 2 did not complete after executing for one time unit. However, because T05 is already a long-running task (e.g., a previously-suspended task that has been resumed) and there are no higher priority suspended tasks in the suspended task queue, the scheduler did not suspend task T05. Rather, it allowed CPU 2 to continue running T05.

Figure 6F:
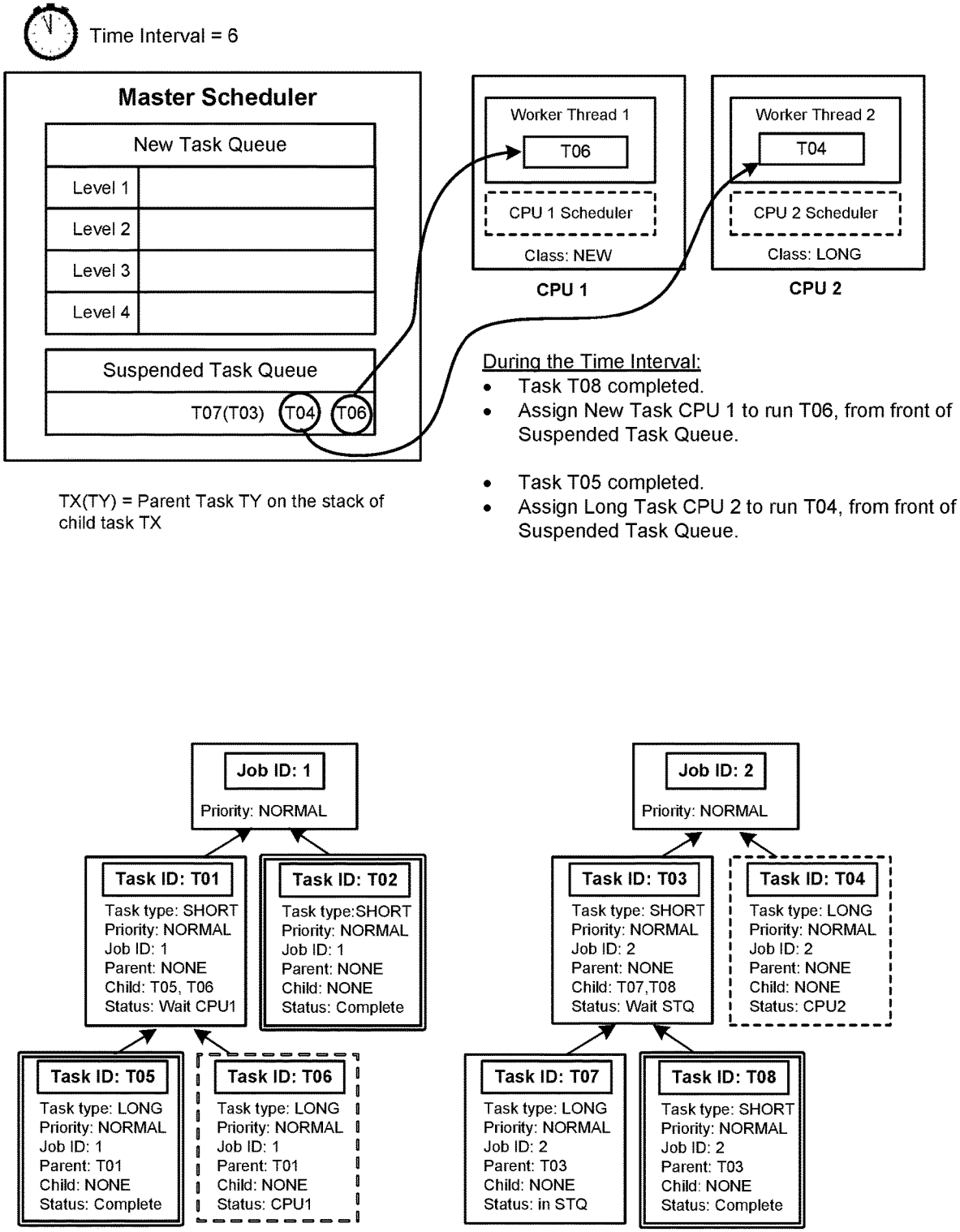

FIG. 6F depicts the status of the multiprocessor system at the end of time interval 6. During time interval 6, both T05 and T08 completed execution, with T08, running on CPU 1, finishing first. Even though CPU 1 is a new task CPU that preferentially runs new tasks, because there are no tasks in the new task queue, the scheduler assigned CPU 1 to run task T06, the next task in the suspended task queue. After T05 completed execution on CPU 2, the CPU 2 scheduler assigned CPU 2 to run T04, the next available task in the suspended task queue.

Figure 6G:
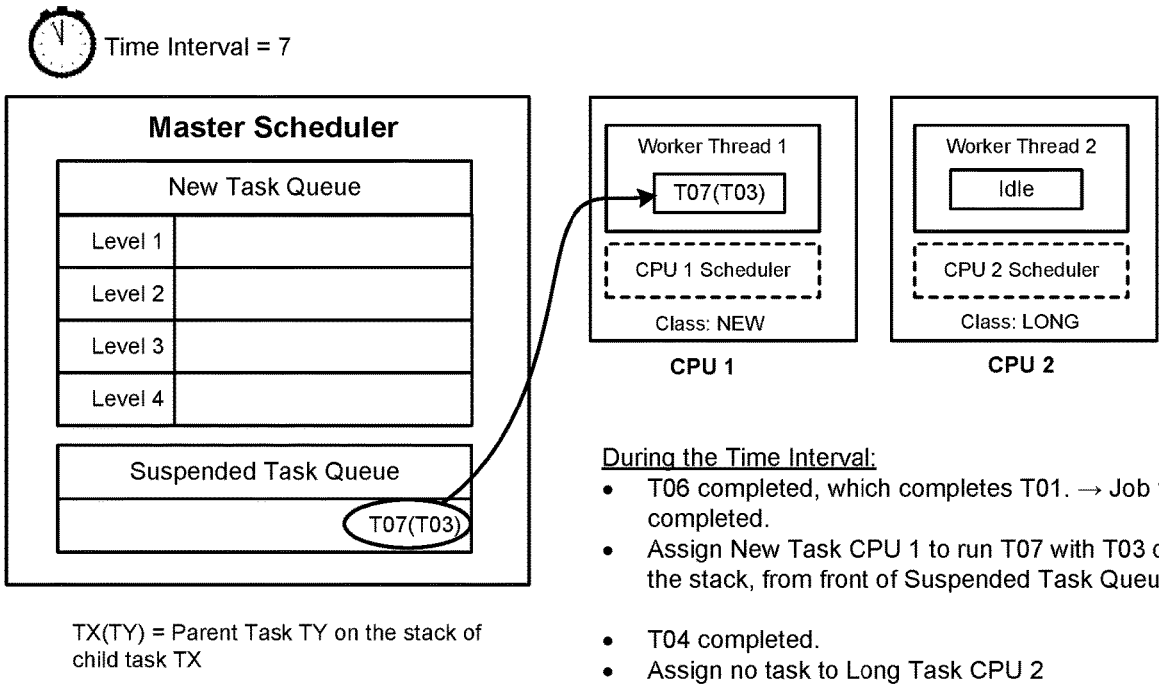
Figure 6G:
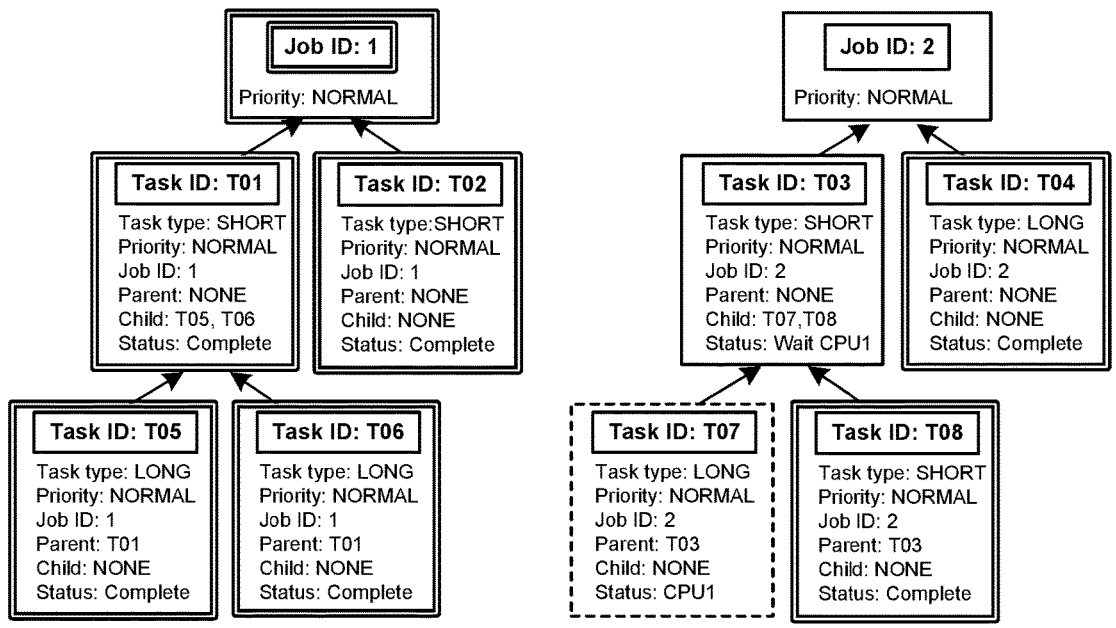

FIG. 6G depicts the status of the multiprocessor system at the end of time interval 7. During time interval 7, both T06 and T04 completed execution, with T06 running on CPU 1 completing first. With the completion of T06, task T01 and Job 1 are complete. The multiprocessor system returned the Job 1 results to the user. Because there are no tasks in the new task queue, the CPU 1 scheduler assigned new task CPU 1 to run T07, the next task in the suspended task queue. Because there are no tasks in either the new task queue or the suspended task queue, CPU 2 remains idle.

Figure 6H:
Figure 6H:
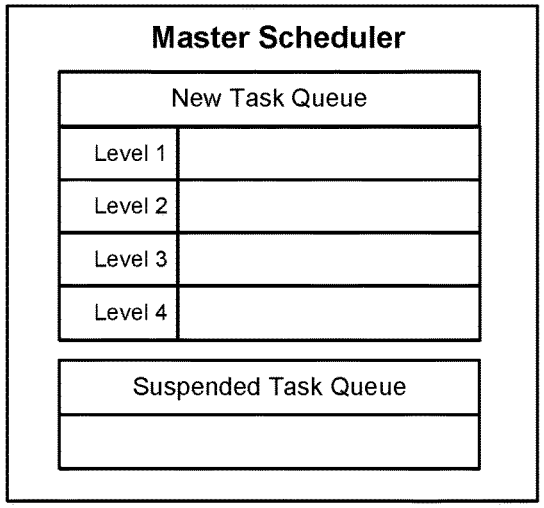
Figure 6H:
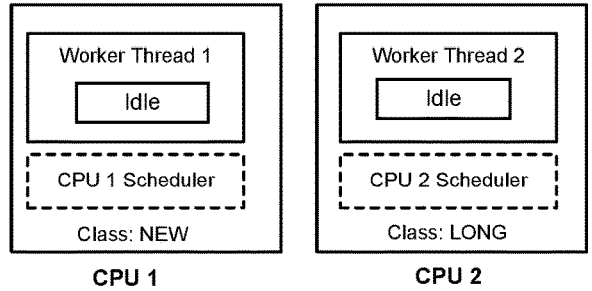
Figure 6H:
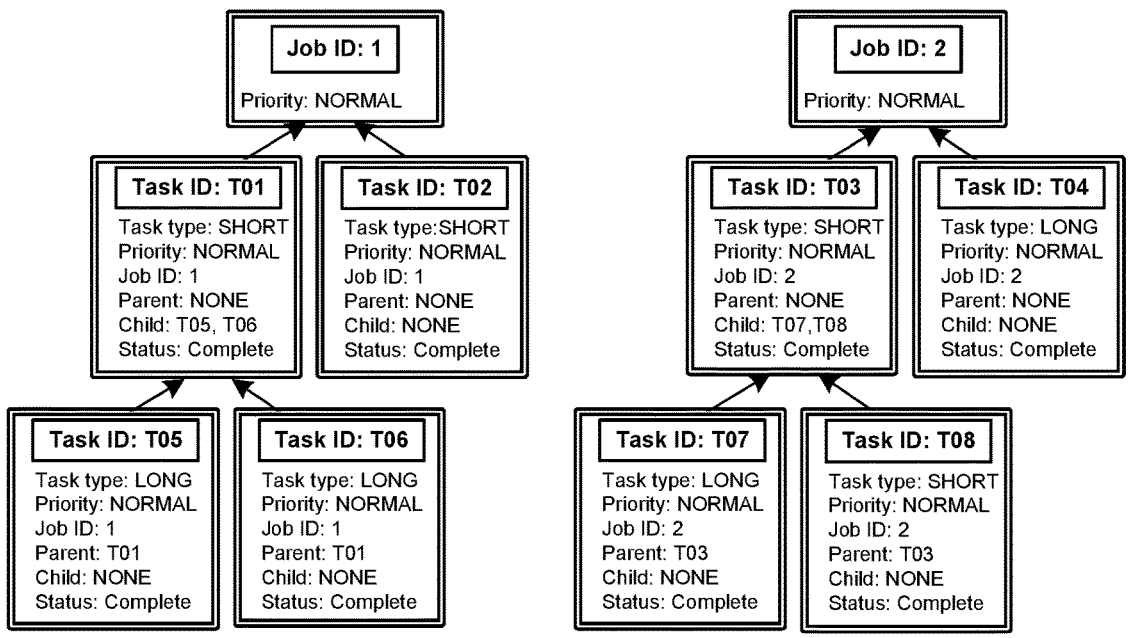

FIG. 6H depicts the status of the multiprocessor system at the end of time interval 8. During time interval 8, T07 completed execution, which completes Job 2. The multiprocessor system returned the Job 2 results to the user. Because there are no tasks in either the new task queue or the suspended task queue, both CPU 1 and CPU 2 remain idle.

FIG. 7 is a flow chart that illustrates a process 700 for task scheduling in a multiprocessor system. Briefly, the process 700 includes assigning, by a multiprocessor system, processors to form a first group of processors and a second group of processors (702); assigning, by the multiprocessor system, the processors in the first group to execute tasks giving priority to tasks in a first task queue including tasks that have executed for less than a predetermined amount of time (704); assigning, by the multiprocessor system, the processors in the second group to execute tasks giving priority to tasks in a second task queue including tasks that have executed for at least the predetermined amount of time (706); determining that a particular task in the first task queue has executed for at least the predetermined amount of time (708); and, in response to determining that the particular task in first task queue has executed for at least the predetermined amount of time, suspending execution the particular task by the processors in the first group, removing the particular task from the first task queue; and adding the particular task to the second task for execution by the processors in the second group (710).

In more detail, the process 700 includes assigning, by a multiprocessor system, the processors of the multiprocessor system to form a first group of processors and a second group of processors (702). In some implementations, the first group of processors preferentially run new tasks (e.g., those tasks that have not previously begun executing) and the second group of processors preferentially run long tasks (e.g., those tasks that were suspended after executing for a predetermined amount of time without completing). In some implementations, the multiprocessor system may assign the processors to form the first group and the second group based on configuration settings provided by an administrator of the multiprocessor system, a user of a client device that communicates with the multiprocessor system, an algorithm, or a predetermined value. In some implementations, the multiprocessor system may assign a different amount of processors to the first and second groups (e.g., two processors in the first group and six processors in the second group).

In some implementations, the multiprocessor system may determine that the amounts of processors in the first group and the second group should be changed (e.g., based on an expected or actual workload, a balance of simple and complex jobs, a time of day, a priority of a user). As a result the multiprocessor system changes the assignment of the processors among the first group and the second group. In some implementations, the multiprocessor system changes the assignment of the processors to satisfy a predetermined relationship. For example, when processing a greater number of complex jobs than simple jobs, the multiprocessor system may assign a larger amount of processors to the second (e.g., long task) group and a smaller amount of processors to the first (e.g., new task) group.

The process 700 also includes assigning, by the multiprocessor system, the processors in the first group to execute tasks giving priority to tasks in a first task queue including tasks that have executed for less than a predetermined amount of time (704). For example, the first task queue may be a new task queue, which manages the execution order of newly-arrived or newly-generated tasks that have not yet been run by a CPU. The first task queue may also manage the execution order of tasks currently running on a CPU, but which have executed for less than a predetermined amount of time. In some implementations, there may be only one new task queue that manages execution order for task assignment to more than one CPU. The multiprocessor system preferentially assigns processors in the first group to execute tasks from the first queue.

In some implementations, the multiprocessor system may prioritize (e.g., order) the tasks in the first task queue based on (i) an order of submission of jobs corresponding to the tasks and/or (ii) relationships among the tasks (e.g., a child task generated by a parent tasks). For example, in some implementations, the first task queue has multiple levels, where the tasks are prioritized according to the levels. In some examples, the multiprocessor system may place newly-arrived or newly-submitted tasks at the back of the first level of the multilevel queue, prioritizing the newly-submitted task behind one or more tasks already in the queue. As another example, a first (e.g., parent) task in the first task queue may generate a second (e.g., child) task. If the first task is located in the first level of the multilevel queue, the multiprocessor system may add the second task to the second level of the queue. The multiprocessor system may then stop execution of the first task and begin executing the second task using a processor in the first group of processors. In some examples, the multiprocessor system may update the first task queue to indicate the relationship between the second task and the first task (e.g., child task, parent task, etc.). The multiprocessor system may also retain working data of the first task on a processing stack accessible to the processor executing the second task and, after completing the second task, resume execution of the first task.

The process 700 also includes assigning, by the multiprocessor system, the processors in the second group to execute tasks giving priority to tasks in a second task queue including tasks that have executed for at least the predetermined amount of time (706). For example, the second task queue may be a suspended task queue that manages execution order for tasks that were suspended after running for at least the predetermined amount of time. In some implementations, there may be only one suspended task queue that manages execution order for suspended task assignment to more than one CPU. In some implementations, the second task queue may be one level. In some implementations the multiprocessor system may prioritize (e.g., order for execution) the tasks in the second task queue based on an order in which tasks are added to the second task queue (e.g., first-in-first-out). In some examples, the multiprocessor system may further prioritize tasks in the second task queue based on an identity, role, or credential of a user associated with the task. For example, the system may prioritize execution of tasks related to jobs submitted by a high-priority user (e.g., a CEO) over a lower-priority user (e.g., a technician).

The process 700 includes determining, by the multiprocessor system, that a particular task in the first task queue has executed for at least the predetermined amount of time (708). In some examples, the multiprocessor may determine that the particular task has executed for at least the predetermined amount of time by detecting an event (e.g., a task time-out event), receiving a notification, or detecting a signal. In some examples, the multiprocessor system may keep track of the time elapsed from when a CPU began running a particular task. In some implementations, the predetermined amount of time may be different for different multiprocessor conditions. For example, the predetermined amount of time may be based on an expected or actual workload, a balance of simple jobs and complex jobs, a particular user or use case.

In response to determining that the particular task in the first task queue has executed for at least the predetermined amount of time, the multiprocessor system (i) suspends execution of the particular task by the processors in the first group, (ii) removes the particular task form the first task queue, and (iii) adds the particular task to the second task queue for execution by the processors in the second group (710). The multiprocessor system may suspend execution of the task by, for example, lowering the priority of the task, triggering an event, or using a custom signal or signal handler.

In some implementations, the multiprocessor removes the suspended task from the first task queue and adds the suspended task to the back of the second task queue.

In some implementations, the multiprocessor system assigns processors in the first group to execute tasks in the first task queue until no more tasks are available in the first task queue. When there are no more first task queue tasks available, the multiprocessor system may assign processors in the first group to execute tasks in the second task queue. Similarly, in some examples, the multiprocessor system assigns processors in the second group to execute tasks in the second task queue until no more tasks are available in the second task queue. When there are no more second task queue tasks available, the multiprocessor system may assign processors in the second group to execute tasks in the first task queue. In some implementations, the multiprocessor system will not preferentially assign a processor to execute a task in the second task queue unless that task has been suspended for a predetermined amount of time.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) display, for displaying information to the user and touchscreen, buttons, a keyboard, or other input device by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Thus, particular embodiments of the invention have been described. Other embodiments are within the scope of the following claims. For example, the actions recited in the claims may be performed in a different order and still achieve desirable results.

What is claimed is:

1. A method comprising:
   assigning, by a multiprocessor system, hardware processors of the multiprocessor system to form a first group of hardware processors and a second group of hardware processors;
   assigning, by the multiprocessor system, the first group of hardware processors to give priority to tasks in a first task queue including tasks that have executed for less than a predetermined amount of time;
   assigning, by the multiprocessor system, the second group of hardware processors to give priority to tasks in a second task queue including tasks that have executed for at least the predetermined amount of time;
   determining that a particular task in the first task queue has executed for at least the predetermined amount of time; and
   in response to determining that the particular task in the first task queue has executed for at least the predetermined amount of time:
      suspending execution of the particular task by the hardware processors in the first group;
      removing the particular task from the first task queue; and
      adding the particular task to the second task queue for execution by the hardware processors in the second group.

2. The method of claim 1, wherein assigning the hardware processors comprises assigning different amounts of processors to the first group and the second group.

3. The method of claim 2, further comprising:
   determining that the amounts of hardware processors in the first group and the second group should be changed; and
   changing the assignments of hardware processors in the multiprocessor system among the first group and the second group to satisfy a predetermined relationship.

4. The method of claim 1, wherein assigning the first group of hardware processors to give priority to tasks in the first task queue comprises assigning the hardware processors in the first group to execute tasks in the first task queue until no more tasks are available in the first task queue, then executing tasks in the second task queue; and
   wherein assigning the second group of hardware processors to give priority to tasks in the second task queue comprises assigning the hardware processors in the second group to execute tasks in the second task queue until no more tasks are available in the second task queue, then executing tasks in the first task queue.

5. The method of claim 1, further comprising prioritizing the tasks in the first task queue based on (i) an order of submission of jobs corresponding to the tasks, and (ii) relationships among the tasks.

6. The method of claim 1, wherein the first task queue has multiple levels and tasks are prioritized according to the levels;
   wherein the method comprises:
      determining that execution of a first task in the first task queue generates a new second task, the first task being located in a first level of the multiple levels;
      adding the second task to the first task queue in a second level of the multiple levels;
      stopping execution of the first task and executing the second task using a hardware processor in the first group of hardware processors.

7. The method of claim 6, wherein the method comprises:
   updating the first task queue to indicate a relationship between the second task and the first task;
   retaining working data of the first task on a processing stack accessible to the hardware processor executing the second task; and
   after completing the second task, resuming execution of the first task.

8. The method of claim 1, further comprising prioritizing the tasks in the second task queue based on an order in which tasks are added to the second task queue.

9. The method of claim 8, wherein the tasks in the second task queue are further prioritized based on an identity, role, or credential of a user associated with a task in the second task queue.

10. The method of claim 1, wherein the first task queue includes only tasks that have executed for less than the predetermined amount of time; and wherein the second task queue includes only tasks that have executed for at least the predetermined amount of time.

11. The method of claim 1, comprising operating a scheduler to (i) assign, based on the assignment of the assignment of the first group to give priority to tasks in the first task queue, tasks from the first task queue to be executed by hardware processors previously assigned to the first group and (ii) assign, based on the assignment of the second group to give priority to tasks in the second task queue, tasks from the first task queue to be executed by hardware processors previously assigned to the second group.

12. The method of claim 1, wherein the assignment of the hardware processors to the first group and the second group is maintained over the course of execution of multiple tasks by the hardware processors.

13. The method of claim 1, comprising using the assignment of the hardware processors to the first group and the second group to select a hardware processor to execute a task.

14. A system comprising:
multiple hardware processors of a multiprocessor system; and
one or more computer-readable media storing instructions that, when executed, cause the multiprocessor system to perform operations comprising:
assigning, by the multiprocessor system, hardware processors of the multiprocessor system to form a first group of hardware processors and a second group of hardware processors;
assigning, by the multiprocessor system, the first group of hardware processors to give priority to tasks in a first task queue including tasks that have executed for less than a predetermined amount of time;
assigning, by the multiprocessor system, the second group of hardware processors to give priority to tasks in a second task queue including tasks that have executed for at least the predetermined amount of time;
determining that a particular task in the first task queue has executed for at least the predetermined amount of time; and
in response to determining that the particular task in the first task queue has executed for at least the predetermined amount of time:
suspending execution of the particular task by the hardware processors in the first group;
removing the particular task from the first task queue; and
adding the particular task to the second task queue for execution by the hardware processors in the second group.

15. The system of claim 14, wherein assigning the hardware processors comprises assigning different amounts of hardware processors to the first group and the second group.

16. The system of claim 14, wherein assigning in the first group of hardware processors to give priority to tasks in the first task queue comprises assigning the hardware processors in the first group to execute tasks in the first task queue until no more tasks are available in the first task queue, then executing tasks in the second task queue; and
wherein assigning the second group of hardware processors to give priority to tasks in the second task queue comprises assigning the hardware processors in the second group to execute tasks in the second task queue until no more tasks are available in the second task queue, then executing tasks in the first task queue.

17. The system of claim 14, wherein the first task queue has multiple levels and tasks are prioritized according to the levels;
wherein the operations comprise:
determining that execution of a first task in the first task queue generates a new second task, the first task being located in a first level of the multiple levels;
adding the second task to the first task queue in a second level of the multiple levels;
stopping execution of the first task and executing the second task using a hardware processor in the first group of hardware processors.

18. One or more non-transitory computer-readable media storing instructions that, when executed by one or more hardware processors of a multiprocessor system, cause the multiprocessor system to perform operations comprising:
assigning, by the multiprocessor system, hardware processors of the multiprocessor system to form a first group of hardware processors and a second group of hardware processors;
assigning, by the multiprocessor system, the first group of hardware processors to give priority to tasks in a first task queue including tasks that have executed for less than a predetermined amount of time;
assigning, by the multiprocessor system, the second group of hardware processors to give priority to tasks in a second task queue including tasks that have executed for at least the predetermined amount of time;
determining that a particular task in the first task queue has executed for at least the predetermined amount of time; and
in response to determining that the particular task in the first task queue has executed for at least the predetermined amount of time:
suspending execution of the particular task by the hardware processors in the first group;
removing the particular task from the first task queue; and
adding the particular task to the second task queue for execution by the hardware processors in the second group.

19. The one or more non-transitory computer-readable media of claim 18, wherein the operations further comprise:
determining that the amounts of hardware processors in the first group and the second group should be changed; and
changing the assignments of hardware processors in the multiprocessor system among the first group and the second group to satisfy a predetermined relationship.

20. The one or more non-transitory computer-readable media of claim 18, wherein assigning the first group of hardware processors to give priority to tasks in the first task queue comprises assigning the hardware processors in the first group to execute tasks in the first task queue until no more tasks are available in the first task queue, then executing tasks in the second task queue; and
wherein assigning the second group of hardware processors to give priority to tasks in the second task queue comprises assigning the hardware processors in the second group to execute tasks in the second task queue until no more tasks are available in the second task queue, then executing tasks in the first task queue.

* * * * *

UNITED STATES PATENT AND TRADEMARK OFFICE
CERTIFICATE OF CORRECTION

PATENT NO. : 10,754,706 B1
APPLICATION NO. : 15/954032
DATED : August 25, 2020
INVENTOR(S) : Jinghui Mo et al.

Page 1 of 1

It is certified that error appears in the above-identified patent and that said Letters Patent is hereby corrected as shown below:

In the Claims

In Claim 11, Column 23, Line 5, after "based on the" delete "assignment of the".

In Claim 16, Column 23, Line 56 (approx.), after "assigning" delete "in".

Signed and Sealed this
Thirteenth Day of October, 2020

Andrei Iancu
*Director of the United States Patent and Trademark Office*